(12) United States Patent
Xu et al.

(10) Patent No.: US 12,137,463 B2
(45) Date of Patent: Nov. 5, 2024

(54) RADIO FREQUENCY CAPABILITY CONFIGURATION METHOD AND APPARATUS

(71) Applicant: Huawei Technologies Co., Ltd., Shenzhen (CN)

(72) Inventors: Zhou Xu, Shanghai (CN); Liwen Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 390 days.

(21) Appl. No.: 17/541,855

(22) Filed: Dec. 3, 2021

(65) Prior Publication Data

US 2022/0095358 A1     Mar. 24, 2022

Related U.S. Application Data

(63) Continuation of application No. PCT/CN2020/093002, filed on May 28, 2020.

(30) Foreign Application Priority Data

Jun. 4, 2019   (CN) .......................... 201910483197.1

(51) Int. Cl.
*H04W 72/23*   (2023.01)
*H04J 3/16*    (2006.01)
(Continued)

(52) U.S. Cl.
CPC .......... *H04W 72/23* (2023.01); *H04J 3/1682* (2013.01); *H04W 72/0453* (2013.01); *H04B 7/0413* (2013.01)

(58) Field of Classification Search
CPC ............. H04W 72/23; H04W 72/0453; H04W 8/24; H04W 8/245; H04J 3/1682; H04B 7/0413
See application file for complete search history.

(56) References Cited

U.S. PATENT DOCUMENTS 8,594,038 B2   11/2013   Feng et al.
9,215,673 B2   12/2015   Shi
(Continued)

FOREIGN PATENT DOCUMENTS

CN   102098784 A   6/2011
CN   102301669     12/2011
(Continued)

OTHER PUBLICATIONS

"Summary of SRS," Agenda Item: 7.1.2.4, Source: Sony, Document for: Discussion and Decision, 3GPP TSG RAN WG1 Meeting #94bis, R1-1811808, Oct. 8-12, 2018, 54 pages.
(Continued)

*Primary Examiner* — Dady Chery
(74) *Attorney, Agent, or Firm* — Slater Matsil, LLP

(57) ABSTRACT

A radio frequency capability configuration method and an apparatus, the method including sending, by a network device, to a terminal, configuration information configuring M sets of radio frequency capabilities, where each set of radio frequency capabilities includes one or more radio frequency capabilities on one or more carriers, where a radio frequency capability on each carrier of the one or more carriers comprises a quantity of multiple-input multiple-output (MIMO) layers, and where M is an integer greater than 1, and sending, by the network device, to the terminal, first indication information to the terminal, where the first indication information indicates a set of radio frequency capabilities in the M sets of radio frequency capabilities.

17 Claims, 11 Drawing Sheets

(51) Int. Cl.
*H04W 72/0453* (2023.01)
*H04B 7/0413* (2017.01)

(56) References Cited

U.S. PATENT DOCUMENTS

| | | | |
|---|---|---|---|
| 10,701,725 | B2 | 6/2020 | Miao et al. |
| 2012/0213154 | A1 | 8/2012 | Gaal et al. |
| 2012/0243455 | A1* | 9/2012 | Feng ............... H04L 5/0037 370/311 |
| 2019/0200288 | A1* | 6/2019 | Folke ............... H04W 48/20 |
| 2019/0200388 | A1* | 6/2019 | Park ............... H04W 72/12 |
| 2020/0029297 | A1* | 1/2020 | Baek ............... H04W 76/11 |

FOREIGN PATENT DOCUMENTS

| | | |
|---|---|---|
| CN | 108471319 | 8/2018 |
| CN | 109151810 | 1/2019 |
| CN | 109698739 | 4/2019 |
| WO | 2017027128 | 2/2017 |
| WO | 2017101011 | 6/2017 |
| WO | 2018099395 | 6/2018 |
| WO | 2018133700 | 7/2018 |
| WO | 2019080138 | 5/2019 |

OTHER PUBLICATIONS

"3rd Generation Partnership Project; Technical Specification Group Radio Access Network; NR; Radio Resource Control (RRC) protocol specification (Release 15)," 3GPP TS 38.331 V15.4.0, Dec. 2018, 474 pages.

"5G; NR; User Equipment (UE) Radio Access Capabilites (3GPP TS 38.306 Version 15.5.0 Release 15)," ETSI TS 138 306 V15.5.0, Technical Specification, May 2019, 51 pages.

* cited by examiner

| | | | | | | | | | | | |
|---|---|---|---|---|---|---|---|---|---|---|---|
| 3.5G | Slot number | 0 | 1 | 2 | 3 | 4 | 5 | 6 | 7 | 8 | 9 |
| | Slot | D | D | D | S | U | D | D | D | S | U |
| 2.6G | Slot number | 0 | | 1 | | 2 | | 3 | | 4 | |
| | Slot | D | | S | | U | | U | | D | |

☐ Uplink time domain resource

| | | | | | | | | | | | |
|---|---|---|---|---|---|---|---|---|---|---|---|
| 3.5G | Slot number | 0 | 1 | 2 | 3 | 4 | 5 | 6 | 7 | 8 | 9 |
| | Slot | D | D | D | S | U | D | D | D | S | U |
| 2.6G | Slot number | 0 | | 1 | | 2 | | 3 | | 4 | |
| | Slot | D | | S | | U | | U | | U | |

☐ Uplink time domain resource

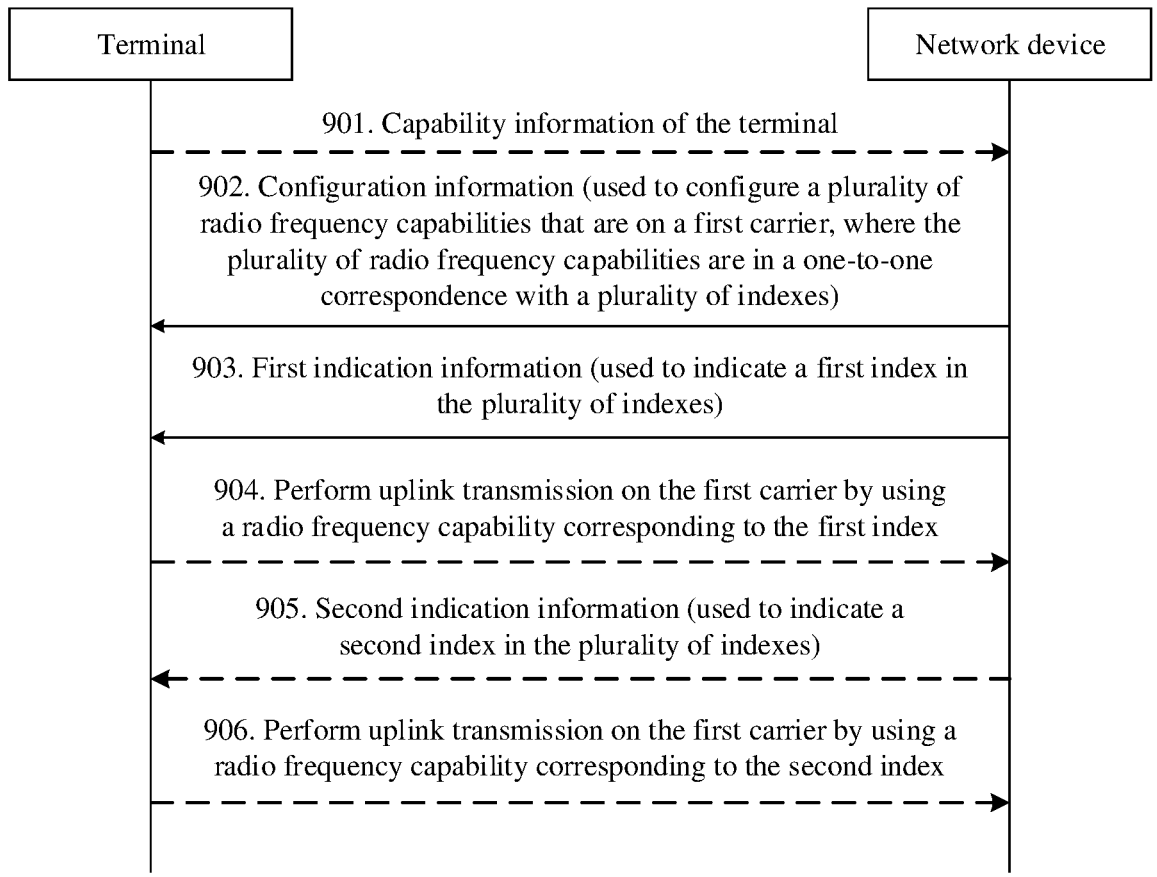
FIG. 8
FIG. 9

| Slot number | 3 | 4 | 5 | 6 | 7 | 8 | 9 | 0 | 1 | 2 |
|---|---|---|---|---|---|---|---|---|---|---|
| Slot of a carrier 1 | S | U | D | D | D | S | U | D | D | D |
| Slot of a carrier 2 | U | | U | | U | | U | | U | |
| Slot of a carrier 3 | U | | U | | U | | U | | U | |
| Slot of a carrier 4 | D | | D | | D | | D | | D | |
| Slot number | 0 | | 1 | | 2 | | 3 | | 4 | |

RADIO FREQUENCY CAPABILITY CONFIGURATION METHOD AND APPARATUS

CROSS-REFERENCE TO RELATED APPLICATIONS

This application is a continuation of International Application No. PCT/CN2020/093002, filed on May 28, 2020, which claims priority to Chinese Patent Application No. 201910483197.1, filed on Jun. 4, 2019. The disclosures of the aforementioned applications are hereby incorporated by reference in their entireties.

TECHNICAL FIELD

This application relates to the field of communication technologies, and in particular, to a radio frequency capability configuration method and an apparatus.

BACKGROUND

With development of wireless communication technologies, a mobile communication network gradually evolves to a fifth generation (5G) network, that is, a new radio (NR) network, and a terminal imposes higher requirements on both downlink transmission performance and uplink transmission performance.

In an actual network, because there is a relatively large amount of downlink data, a relatively large quantity of downlink time domain resources are usually allocated to the terminal, and a relatively small quantity of uplink time domain resources are allocated to a terminal. Limited uplink time domain resources cause relatively poor uplink transmission performance.

Therefore, how to improve uplink transmission performance of a terminal is an urgent problem to be resolved.

SUMMARY

Embodiments of this application provide a radio frequency capability configuration method and an apparatus, to improve uplink transmission performance of a terminal.

To achieve the foregoing objective, the embodiments of this application provide the following technical solutions.

According to a first aspect, a radio frequency capability configuration method is provided. The method may be applied to a terminal or a chip in the terminal. An example in which the method is applied to the terminal is used for description below.

The radio frequency capability configuration method provided in the first aspect includes the terminal receives, from a network device, configuration information used to configure a plurality of radio frequency capabilities that are on a first carrier, where the plurality of radio frequency capabilities are in a one-to-one correspondence with a plurality of indexes, and the terminal receives, from the network device, first indication information used to indicate a first index, where the first index is one of the plurality of indexes. According to the method provided in the first aspect, for one carrier, the network device may configure, for the terminal, a plurality of radio frequency capabilities that are on the carrier and that are in a one-to-one correspondence with a plurality of indexes, and then indicate an index by using indication information, so that the terminal can determine, by using the index, a to-be-used radio frequency capability in the plurality of radio frequency capabilities. The network device can flexibly indicate a radio frequency capability on a carrier by using an indicated index. In this way, on different time domain resources, the network device can indicate a radio frequency capability that is on a carrier to the terminal based on radio frequency capabilities used by the terminal on the carrier, thereby improving an uplink transmission capability of the terminal.

In a possible implementation, the method further includes the terminal performs uplink transmission on the first carrier by using a radio frequency capability corresponding to the first index.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and one or more carriers other than the first carrier.

In a possible implementation, the method further includes the terminal sends capability information of the terminal to the network device, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier. In this possible implementation, the network device may determine the plurality of radio frequency capabilities on the first carrier based on the capability information of the terminal, so that the plurality of radio frequency capabilities on the first carrier determined by the network device better meet an actual requirement of the terminal.

In a possible implementation, the method further includes the terminal receives, from the network device, second indication information used to indicate a second index, where the second index is one of the plurality of indexes, and the terminal performs uplink transmission on the first carrier by using a radio frequency capability corresponding to the second index.

In a possible implementation, the configuration information is carried in radio resource control (RRC) signaling.

In a possible implementation, the first indication information is carried in media access control control element (MAC CE) signaling or downlink control information (DCI).

According to a second aspect, a radio frequency capability configuration method is provided. The method may be applied to a network device or a chip in the network device. An example in which the method is applied to the network device is used for description below.

The radio frequency capability configuration method provided in the second aspect includes the network device sends, to a terminal, configuration information used to configure a plurality of radio frequency capabilities that are on a first carrier, where the plurality of radio frequency capabilities are in a one-to-one correspondence with a plurality of indexes, and the network device sends, to the terminal, first indication information used to indicate a first index, where the first index is one of the plurality of indexes. According to the method provided in the second aspect, for one carrier, the network device may configure, for the terminal, a plurality of radio frequency capabilities that are on the carrier and that are in a one-to-one correspondence with a plurality of indexes, and then indicate an index by using indication information, so that the terminal can determine, by using the index, a to-be-used radio frequency capability in the plurality of radio frequency capabilities. The network device can flexibly indicate a radio frequency capability on a carrier by using an indicated index. In this way, on different time domain resources, the network device can indicate a radio frequency capability that is on a carrier to the terminal based on radio frequency capabilities used by the terminal on the carrier, thereby improving an uplink transmission capability of the terminal.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and one or more carriers other than the first carrier.

In a possible implementation, the method further includes the network device receives capability information of the terminal from the terminal, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier. In this possible implementation, the network device may determine the plurality of radio frequency capabilities on the first carrier based on the capability information of the terminal, so that the plurality of radio frequency capabilities on the first carrier determined by the network device better meet an actual requirement of the terminal.

In a possible implementation, that the network device sends the first indication information to the terminal includes the network device sends the first indication information to the terminal based on uplink scheduling statuses on the first carrier and the one or more carriers other than the first carrier.

In a possible implementation, that the network device sends the first indication information to the terminal based on uplink scheduling statuses on the first carrier and the one or more carriers other than the first carrier includes the network device determines, based on locations of uplink scheduling time domain resources of the first carrier and the one or more carriers, that single transmission is performed on the first carrier or that simultaneous transmission is performed on the first carrier and the one or more carriers, where when it is determined that single transmission is performed on the first carrier, a radio frequency capability corresponding to the first index is the radio frequency capability used on the first carrier in the case of single transmission on the first carrier, or when it is determined that simultaneous transmission is performed on the first carrier and the one or more carriers, a radio frequency capability corresponding to the first index is the radio frequency capability used on the first carrier in the case of simultaneous transmission on the first carrier and the one or more carriers.

In a possible implementation, the method further includes the network device sends second indication information to the terminal, where the second indication information is used to indicate a second index, and the second index is one of the plurality of indexes.

In a possible implementation, the configuration information is carried in RRC signaling.

In a possible implementation, the first indication information is carried in MAC CE signaling or DCI.

According to a third aspect, a radio frequency capability configuration method is provided. The method may be applied to a terminal or a chip in the terminal. An example in which the method is applied to the terminal is used for description below.

The radio frequency capability configuration method provided in the third aspect includes the terminal receives, from a network device, configuration information used to configure a plurality of radio frequency capabilities that are on a first carrier, and the terminal performs, by using one of the plurality of radio frequency capabilities, uplink transmission on the first carrier based on uplink scheduling statuses on the first carrier and one or more carriers other than the first carrier. According to the method provided in the third aspect, the network device may configure one or more radio frequency capabilities on each of one or more carriers for the terminal. The terminal may select, based on statuses of uplink scheduling performed by the network device on one carrier and one or more carriers other than the carrier, one of a plurality of radio frequency capabilities on the carrier for uplink transmission, and the network device does not need to indicate, to the terminal, a radio frequency capability used by the terminal on the carrier. On different time domain resources, the terminal may flexibly determine, based on radio frequency capabilities of the terminal, a radio frequency capability used on a carrier, thereby improving an uplink transmission capability of the terminal.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and the one or more carriers other than the first carrier.

In a possible implementation, that the terminal performs, by using one of the plurality of radio frequency capabilities, uplink transmission on the first carrier based on uplink scheduling statuses on the first carrier and one or more carriers other than the first carrier includes the terminal determines, based on locations of uplink scheduling time domain resources of the first carrier and the one or more carriers, that single transmission is performed on the first carrier or that simultaneous transmission is performed on the first carrier and the one or more carriers, where the terminal performs, when the terminal determines that single transmission is performed on the first carrier, uplink transmission on the first carrier by using the radio frequency capability used on the first carrier in the case of single transmission on the first carrier, or the terminal performs, when the terminal determines that simultaneous transmission is performed on the first carrier and the one or more carriers, uplink transmission on the first carrier by using the radio frequency capability used on the first carrier in the case of simultaneous transmission on the first carrier and the one or more carriers.

In a possible implementation, the method further includes the terminal sends capability information of the terminal to the network device, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier. In this possible implementation, the network device may determine the plurality of radio frequency capabilities on the first carrier based on the capability information of the terminal, so that the plurality of radio frequency capabilities on the first carrier determined by the network device better meet an actual requirement of the terminal.

In a possible implementation, the configuration information is carried in RRC signaling.

According to a fourth aspect, a radio frequency capability configuration method is provided. The method may be applied to a network device or a chip in the network device. An example in which the method is applied to the network device is used for description below.

The radio frequency capability configuration method provided in the fourth aspect includes the network device obtains configuration information, where the configuration information is used to configure a plurality of radio frequency capabilities corresponding to a first carrier, and the network device sends the configuration information to a terminal. According to the method provided in the fourth aspect, the network device may configure one or more radio frequency capabilities on each of one or more carriers for the terminal. The terminal may select, based on statuses of uplink scheduling performed by the network device on one carrier and one or more carriers other than the carrier, one of a plurality of radio frequency capabilities on the carrier for uplink transmission, and the network device does not need to indicate, to the terminal, a radio frequency capability used by the terminal on the carrier. On different time domain resources, the terminal may flexibly determine, based on radio frequency capabilities of the terminal, a radio frequency capability used on a carrier, thereby improving an uplink transmission capability of the terminal.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and the one or more carriers other than the first carrier.

In a possible implementation, the method further includes the network device receives capability information of the terminal from the terminal, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier. In this possible implementation, the network device may determine the plurality of radio frequency capabilities on the first carrier based on the capability information of the terminal, so that the plurality of radio frequency capabilities on the first carrier determined by the network device better meet an actual requirement of the terminal.

In a possible implementation, the configuration information is carried in RRC signaling.

According to a fifth aspect, a radio frequency capability configuration method is provided. The method may be applied to a terminal or a chip in the terminal. An example in which the method is applied to the terminal is used for description below.

The radio frequency capability configuration method provided in the fifth aspect includes the terminal receives configuration information from a network device, where the configuration information is used to configure M sets of radio frequency capabilities, at least one set of radio frequency capabilities in the M sets of radio frequency capabilities includes information about radio frequency capabilities on a plurality of carriers, and M is an integer greater than 1, the terminal receives first indication information from the network device, where the first indication information is used to indicate an $(m1)^{th}$ set of radio frequency capabilities in the M sets of radio frequency capabilities, the $(m1)^{th}$ set of radio frequency capabilities includes information about radio frequency capabilities on x1 carriers, m1 is an integer greater than 0 and less than or equal to M, and x1 is an integer greater than 0, and the terminal performs uplink transmission on the x1 carriers by using the radio frequency capabilities on the x1 carriers. According to the method provided in the fifth aspect, the network device may configure, for the terminal, a plurality of sets of radio frequency capabilities, and then indicate one set of radio frequency capabilities by using indication information, so that the terminal can determine, by using the indication information, a set of to-be-used radio frequency capabilities in the plurality of sets of radio frequency capabilities. The network device can flexibly indicate a set of radio frequency capabilities to be used by the terminal. In this way, on different time domain resources, the network device can indicate a set of to-be-used radio frequency capabilities to the terminal based on radio frequency capabilities used by the terminal on a carrier, thereby improving an uplink transmission capability of the terminal.

In a possible implementation, the information about the radio frequency capabilities on the x1 carriers includes information about a radio frequency capability on each of the x1 carriers when the terminal performs uplink transmission on the x1 carriers in time division multiplexing mode, and that the terminal performs uplink transmission on the x1 carriers by using the radio frequency capabilities on the x1 carriers includes the terminal performs uplink transmission on the x1 carriers by using the radio frequency capabilities on the x1 carriers in time division multiplexing mode.

In a possible implementation, the information about the radio frequency capabilities on the x1 carriers includes information about a radio frequency capability on each of the x1 carriers when the terminal performs uplink transmission on the x1 carriers in simultaneous transmission mode, and that the terminal performs uplink transmission on the x1 carriers by using the radio frequency capabilities on the x1 carriers includes the terminal performs uplink transmission on the x1 carriers by using the radio frequency capabilities on the x1 carriers in simultaneous transmission mode.

In a possible implementation, the method further includes the terminal receives second indication information from the network device, where the second indication information is used to indicate an $(m2)^{th}$ set of radio frequency capabilities in the M sets of radio frequency capabilities, the $(m2)^{th}$ set of radio frequency capabilities includes information about radio frequency capabilities on x2 carriers, m2 is an integer greater than 0 and less than or equal to M, and x2 is an integer greater than 0, and the terminal performs uplink transmission on the x2 carriers by using the radio frequency capabilities on the x2 carriers.

In a possible implementation, the method further includes sending, by the terminal, capability information of the terminal to the network device, where the capability information of the terminal includes N pieces of single-carrier capability information and at least one piece of carrier combination capability information, one piece of single-carrier capability information in the N pieces of single-carrier capability information is information about a radio frequency capability used on one of N carriers in the case of single-carrier transmission, and the carrier combination capability information is information about a radio frequency capability used on each of at least two of the N carriers in the case of simultaneous transmission or time division multiplexing (TDM) transmission on the at least two carriers.

According to a sixth aspect, a radio frequency capability configuration method is provided. The method may be applied to a network device or a chip in the network device. An example in which the method is applied to the network device is used for description below.

The radio frequency capability configuration method provided in the sixth aspect includes the network device sends configuration information to a terminal, where the configuration information is used to configure M sets of radio frequency capabilities, at least one set of radio frequency capabilities in the M sets of radio frequency capabilities includes information about radio frequency capabilities on a plurality of carriers, and M is an integer greater than 1, and the network device sends first indication information to the terminal, where the first indication information is used to indicate an $(m1)^{th}$ set of radio frequency capabilities in the M sets of radio frequency capabilities, the $(m1)^{th}$ set of radio frequency capabilities includes information about radio frequency capabilities on x1 carriers, m1 is an integer greater than 0 and less than or equal to M, and x1 is an integer greater than 0. According to the method provided in the sixth aspect, the network device may configure, for the terminal, a plurality of sets of radio frequency capabilities, and then indicate one set of radio frequency capabilities by using indication information, so that the terminal can determine, by using the indication information, a set of to-be-used radio frequency capabilities in the plurality of sets of radio frequency capabilities. The network device can flexibly indicate a set of radio frequency capabilities to be used by the terminal. In this way, on different time domain resources, the network device can indicate a set of to-be-used radio frequency capabilities to the terminal based on radio frequency capabilities used by the terminal on a carrier, thereby improving an uplink transmission capability of the terminal.

In a possible implementation, the information about the radio frequency capabilities on the x1 carriers includes information about a radio frequency capability on each of the x1 carriers when the terminal performs uplink transmission on the x1 carriers in time division multiplexing mode.

In a possible implementation, the information about the radio frequency capabilities on the x1 carriers includes information about a radio frequency capability on each of the x1 carriers when the terminal performs uplink transmission on the x1 carriers in simultaneous transmission mode.

In a possible implementation, the method further includes the network device sends second indication information to the terminal, where the second indication information is used to indicate an $(m2)^{th}$ set of radio frequency capabilities in the M sets of radio frequency capabilities, the $(m2)^{th}$ set of radio frequency capabilities includes information about radio frequency capabilities on x2 carriers, m2 is an integer greater than 0 and less than or equal to M, and x2 is an integer greater than 0.

In a possible implementation, the method further includes the network device receives capability information of the terminal from the terminal, where the capability information of the terminal includes N pieces of single-carrier capability information and at least one piece of carrier combination capability information, one piece of single-carrier capability information in the N pieces of single-carrier capability information is information about a radio frequency capability used on one of N carriers in the case of single-carrier transmission, and the carrier combination capability information is information about a radio frequency capability used on each of at least two of the N carriers in the case of simultaneous transmission or TDM transmission on the at least two carriers. That the network device sends configuration information to a terminal includes the network device sends the configuration information to the terminal based on the capability information of the terminal.

According to a seventh aspect, a communication apparatus is provided. The apparatus includes a communication unit and a processing unit, where the processing unit is configured to receive configuration information from a network device via the communication unit, where the configuration information is used to configure a plurality of radio frequency capabilities that are on a first carrier, and the plurality of radio frequency capabilities are in a one-to-one correspondence with a plurality of indexes, and the processing unit is further configured to receive first indication information from the network device via the communication unit, where the first indication information is used to indicate a first index, and the first index is one of the plurality of indexes.

In a possible implementation, the processing unit is further configured to perform, via the communication unit, uplink transmission on the first carrier by using a radio frequency capability corresponding to the first index.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and one or more carriers other than the first carrier.

In a possible implementation, the processing unit is further configured to send capability information of the communication apparatus to the network device via the communication unit, where the capability information of the communication apparatus includes information about the radio frequency capability used on the first carrier in the case of single transmission on the first carrier and information about the radio frequency capability used on the first carrier in the case of simultaneous transmission on the first carrier and the one or more carriers other than the first carrier.

In a possible implementation, the processing unit is further configured to receive second indication information from the network device via the communication unit, where the second indication information is used to indicate a second index, and the second index is one of the plurality of indexes, and the processing unit is further configured to perform, via the communication unit, uplink transmission on the first carrier by using a radio frequency capability corresponding to the second index.

In a possible implementation, the configuration information is carried in RRC signaling.

In a possible implementation, the first indication information is carried in MAC CE signaling or DCI.

According to an eighth aspect, a communication apparatus is provided. The apparatus includes a communication unit and a processing unit, where the processing unit is configured to send configuration information to a terminal via the communication unit, where the configuration information is used to configure a plurality of radio frequency capabilities that are on a first carrier, and the plurality of radio frequency capabilities are in a one-to-one correspondence with a plurality of indexes, and the processing unit is further configured to send first indication information to the terminal via the communication unit, where the first indication information is used to indicate a first index, and the first index is one of the plurality of indexes.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and one or more carriers other than the first carrier.

In a possible implementation, the processing unit is further configured to receive capability information of the terminal from the terminal via the communication unit, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier.

In a possible implementation, the processing unit is specifically configured to send, via the communication unit, the first indication information to the terminal based on uplink scheduling statuses on the first carrier and the one or more carriers other than the first carrier.

In a possible implementation, the processing unit is specifically configured to determine, based on locations of uplink scheduling time domain resources of the first carrier and the one or more carriers, that single transmission is performed on the first carrier or that simultaneous transmission is performed on the first carrier and the one or more carriers, where when it is determined that single transmission is performed on the first carrier, a radio frequency capability corresponding to the first index is the radio frequency capability used on the first carrier in the case of single transmission on the first carrier, or when it is determined that simultaneous transmission is performed on the first carrier and the one or more carriers, a radio frequency capability corresponding to the first index is the radio frequency capability used on the first carrier in the case of simultaneous transmission on the first carrier and the one or more carriers.

In a possible implementation, the processing unit is further configured to send second indication information to the terminal via the communication unit, where the second indication information is used to indicate a second index, and the second index is one of the plurality of indexes.

In a possible implementation, the configuration information is carried in RRC signaling.

In a possible implementation, the first indication information is carried in MAC CE signaling or DCI.

According to a ninth aspect, a communication apparatus is provided. The apparatus includes a communication unit and a processing unit, where the processing unit is configured to receive configuration information from a network device via the communication unit, where the configuration information is used to configure a plurality of radio frequency capabilities that are on a first carrier, and the processing unit is further configured to perform, via the communication unit by using one of the plurality of radio frequency capabilities, uplink transmission on the first carrier based on uplink scheduling statuses on the first carrier and one or more carriers other than the first carrier.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and the one or more carriers other than the first carrier.

In a possible implementation, the processing unit is specifically configured to determine, based on locations of uplink scheduling time domain resources of the first carrier and the one or more carriers, that single transmission is performed on the first carrier or that simultaneous transmission is performed on the first carrier and the one or more carriers, where the processing unit performs, via the communication unit when determining that single transmission is performed on the first carrier, uplink transmission on the first carrier by using the radio frequency capability used on the first carrier in the case of single transmission on the first carrier, or the processing unit performs, via the communication unit when determining that simultaneous transmission is performed on the first carrier and the one or more carriers, uplink transmission on the first carrier by using the radio frequency capability used on the first carrier in the case of simultaneous transmission on the first carrier and the one or more carriers.

In a possible implementation, the processing unit is further configured to send capability information of the communication apparatus to the network device via the communication unit, where the capability information of the communication apparatus includes information about the radio frequency capability used on the first carrier in the case of single transmission on the first carrier and information about the radio frequency capability used on the first carrier in the case of simultaneous transmission on the first carrier and the one or more carriers other than the first carrier.

In a possible implementation, the configuration information is carried in RRC signaling.

According to a tenth aspect, a communication apparatus is provided. The apparatus includes a communication unit and a processing unit, where the processing unit is configured to obtain configuration information, where the configuration information is used to configure a plurality of radio frequency capabilities corresponding to a first carrier, and the communication unit is configured to send the configuration information to a terminal.

In a possible implementation, the plurality of radio frequency capabilities on the first carrier include a radio frequency capability used on the first carrier in the case of single transmission on the first carrier.

In a possible implementation, the plurality of radio frequency capabilities on the first carrier include a radio frequency capability used on the first carrier in the case of simultaneous transmission on the first carrier and one or more carriers other than the first carrier.

In a possible implementation, the communication unit is further configured to receive capability information of the terminal from the terminal, where the capability information of the terminal includes information about the radio frequency capability used on the first carrier in the case of single transmission on the first carrier and information about the radio frequency capability used on the first carrier in the case of simultaneous transmission on the first carrier and the one or more carriers other than the first carrier.

In a possible implementation, the configuration information is carried in RRC signaling.

According to an eleventh aspect, a communication apparatus is provided. The apparatus has a function of implementing the method provided in the fifth aspect. The function may be implemented by hardware, or may be implemented by hardware executing corresponding software. The hardware or the software includes one or more units corresponding to the foregoing function. For example, the apparatus may include a communication unit and a processing unit. The processing unit is configured to perform a processing action (for example, an action other than sending and/or receiving) in the fifth aspect, and the communication unit is configured to perform a sending action and/or a receiving action in the fifth aspect. Optionally, the action performed by the communication unit is performed under control of the processing unit. Optionally, the communication unit includes a sending unit and a receiving unit. In this case, the sending unit is configured to perform a sending action in the fifth aspect, and the receiving unit is configured to perform a receiving action in the fifth aspect. The apparatus may exist in a product form of a chip.

For example, the communication apparatus provided in the eleventh aspect includes a communication unit and a processing unit, where the processing unit is configured to receive configuration information from a network device via the communication unit, where the configuration information is used to configure M sets of radio frequency capabilities, at least one set of radio frequency capabilities in the M sets of radio frequency capabilities includes information about radio frequency capabilities on a plurality of carriers, and M is an integer greater than 1, the processing unit is further configured to receive first indication information from the network device via the communication unit, where the first indication information is used to indicate an $(m1)^{th}$ set of radio frequency capabilities in the M sets of radio frequency capabilities, the $(m1)^{th}$ set of radio frequency capabilities includes information about radio frequency capabilities on x1 carriers, m1 is an integer greater than 0 and less than or equal to M, and x1 is an integer greater than 0, and the processing unit is further configured to perform, via the communication unit, uplink transmission on the x1 carriers by using the radio frequency capabilities on the x1 carriers.

In a possible implementation, the information about the radio frequency capabilities on the x1 carriers includes information about a radio frequency capability on each of the x1 carriers when the apparatus performs uplink transmission on the x1 carriers in time division multiplexing mode, and the processing unit is specifically configured to perform, via the communication unit, uplink transmission on the x1 carriers by using the radio frequency capabilities on the x1 carriers in time division multiplexing mode.

In a possible implementation, the information about the radio frequency capabilities on the x1 carriers includes information about a radio frequency capability on each of the x1 carriers when the apparatus performs uplink transmission on the x1 carriers in simultaneous transmission mode, and the processing unit is specifically configured to perform, via the communication unit, uplink transmission on the x1 carriers by using the radio frequency capabilities on the x1 carriers in simultaneous transmission mode.

In a possible implementation, the processing unit is further configured to receive second indication information from the network device via the communication unit, where the second indication information is used to indicate an $(m2)^{th}$ set of radio frequency capabilities in the M sets of radio frequency capabilities, the $(m2)^{th}$ set of radio frequency capabilities includes information about radio frequency capabilities on x2 carriers, m2 is an integer greater than 0 and less than or equal to M, and x2 is an integer greater than 0, and the processing unit is further configured to perform, via the communication unit, uplink transmission on the x2 carriers by using the radio frequency capabilities on the x2 carriers.

In a possible implementation, the processing unit is further configured to send capability information of the apparatus to the network device via the communication unit, where the capability information of the apparatus includes N pieces of single-carrier capability information and at least one piece of carrier combination capability information, one piece of single-carrier capability information in the N pieces of single-carrier capability information is information about a radio frequency capability used on one of N carriers in the case of single-carrier transmission, and the carrier combination capability information is information about a radio frequency capability used on each of at least two of the N carriers in the case of simultaneous transmission or time division multiplexing transmission on the at least two carriers.

According to a twelfth aspect, a communication apparatus is provided. The apparatus has a function of implementing the method provided in the sixth aspect. The function may be implemented by hardware, or may be implemented by hardware executing corresponding software. The hardware or the software includes one or more units corresponding to the foregoing function. For example, the apparatus may include a communication unit and a processing unit. The processing unit is configured to perform a processing action (for example, an action other than sending and/or receiving) in the sixth aspect, and the communication unit is configured to perform a sending action and/or a receiving action in the sixth aspect. Optionally, the action performed by the communication unit is performed under control of the processing unit. Optionally, the communication unit includes a sending unit and a receiving unit. In this case, the sending unit is configured to perform a sending action in the sixth aspect, and the receiving unit is configured to perform a receiving action in the sixth aspect. The apparatus may exist in a product form of a chip.

For example, the communication apparatus provided in the twelfth aspect includes a communication unit and a processing unit, where the processing unit is configured to send configuration information to a terminal via the communication unit, where the configuration information is used to configure M sets of radio frequency capabilities, at least one set of radio frequency capabilities in the M sets of radio frequency capabilities includes information about radio frequency capabilities on a plurality of carriers, and M is an integer greater than 1, and the processing unit is further configured to send first indication information to the terminal via the communication unit, where the first indication information is used to indicate an $(m1)^{th}$ set of radio frequency capabilities in the M sets of radio frequency capabilities, the $(m1)^{th}$ set of radio frequency capabilities includes information about radio frequency capabilities on x1 carriers, m1 is an integer greater than 0 and less than or equal to M, and x1 is an integer greater than 0.

In a possible implementation, the information about the radio frequency capabilities on the x1 carriers includes information about a radio frequency capability on each of the x1 carriers when the terminal performs uplink transmission on the x1 carriers in time division multiplexing mode.

In a possible implementation, the information about the radio frequency capabilities on the x1 carriers includes information about a radio frequency capability on each of the x1 carriers when the terminal performs uplink transmission on the x1 carriers in simultaneous mode.

In a possible implementation, the processing unit is further configured to send second indication information to the terminal via the communication unit, where the second indication information is used to indicate an $(m2)^{th}$ set of radio frequency capabilities in the M sets of radio frequency capabilities, the $(m2)^{th}$ set of radio frequency capabilities includes information about radio frequency capabilities on x2 carriers, m2 is an integer greater than 0 and less than or equal to M, and x2 is an integer greater than 0.

In a possible implementation, the processing unit is further configured to receive capability information of the terminal from the terminal via the communication unit, where the capability information of the terminal includes N pieces of single-carrier capability information and at least one piece of carrier combination capability information, one piece of single-carrier capability information in the N pieces of single-carrier capability information is information about a radio frequency capability used on one of N carriers in the case of single-carrier transmission, and the carrier combination capability information is information about a radio frequency capability used on each of at least two of the N carriers in the case of simultaneous transmission or time division multiplexing transmission on the at least two carriers, and the processing unit is specifically configured to send, via the communication unit, the configuration information to the terminal based on the capability information of the terminal.

According to a thirteenth aspect, a communication apparatus is provided. The apparatus includes a processor. The processor is connected to a memory, the memory is configured to store computer-executable instructions, and the processor executes the computer-executable instructions stored in the memory, to implement any method provided in the first aspect, the second aspect, the third aspect, the fourth aspect, the fifth aspect, or the sixth aspect. The memory and the processor may be integrated together, or may be independent components. If the memory and the processor are independent components, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the communication apparatus further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes a transmitter and a receiver. In this case, the transmitter is configured to perform a sending action in a corresponding method, and the receiver is configured to perform a receiving action in a corresponding method.

In a possible implementation, the communication apparatus exists in a product form of a chip.

According to a fourteenth aspect, a computer-readable storage medium is provided, and includes instructions. When the instructions are run on a computer, the computer is enabled to perform any method provided in the first aspect, the second aspect, the third aspect, the fourth aspect, the fifth aspect, or the sixth aspect.

According to a fifteenth aspect, a computer program product including instructions is provided. When the instructions are run on a computer, the computer is enabled to perform any method provided in the first aspect, the second aspect, the third aspect, the fourth aspect, the fifth aspect, or the sixth aspect.

According to a sixteenth aspect, a chip is provided. The chip includes a processor and an interface circuit, and the interface circuit is coupled to the processor. The processor is configured to run a computer program or instructions, to implement the method according to any one of the first aspect to the sixth aspect. The interface circuit is configured to communicate with another module outside the chip.

According to a seventeenth aspect, a communication apparatus is provided, where the communication apparatus is configured to implement the method according to any one of the first aspect to the sixth aspect.

For technical effects brought by any implementation of the seventh aspect to the seventeenth aspect, refer to the technical effects brought by a corresponding implementation of the first aspect, the second aspect, the third aspect, the fourth aspect, the fifth aspect, or the sixth aspect. Details are not described herein again.

It should be noted that various possible implementations of any one of the foregoing aspects may be combined provided that the solutions are not contradictory.

BRIEF DESCRIPTION OF THE DRAWINGS

FIG. 5 is a schematic diagram of a radio frequency channel according to an embodiment of this application;

FIG. 6 to FIG. 8 are each a schematic diagram of a slot configuration according to an embodiment of this application;

FIG. 9 is a flowchart of a radio frequency capability configuration method according to an embodiment of this application;

DETAILED DESCRIPTION OF ILLUSTRATIVE EMBODIMENTS

The following describes the technical solutions in embodiments of this application with reference to the accompanying drawings in the embodiments of this application. In descriptions of this application, unless otherwise specified, "/" means "or". For example, A/B may represent A or B. "And/or" in this specification describes an association relationship for describing associated objects and represents that there may be three relationships. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" are not intended to limit a quantity or an execution sequence, and the terms such as "first" and "second" do not indicate a definite difference.

Figure 1:
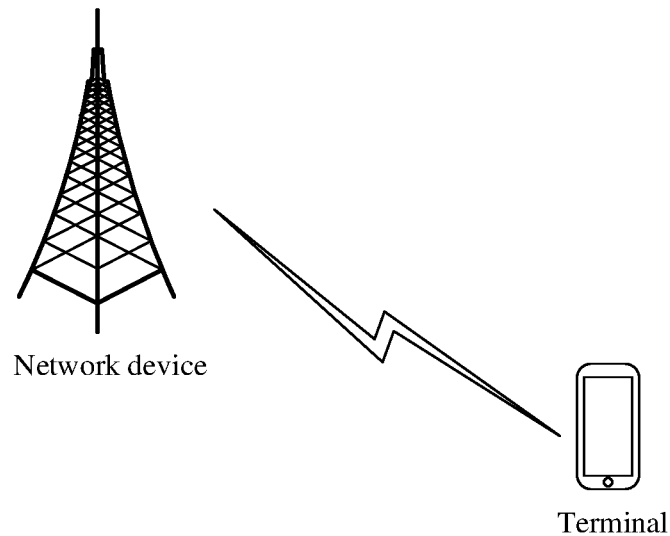
FIG. 1 is a schematic diagram of communication between a terminal and a network device.

The embodiments of this application provide a communication system. The communication system includes at least one network device and at least one terminal, and the at least one terminal may communicate with one or more of the at least one network device. One network device and one terminal are used as an example. Refer to FIG. 1. The network device and the terminal may perform wireless communication. It should be noted that the network device and the terminal included in the communication system shown in FIG. 1 are merely examples. In this embodiment of this application, a type and a quantity of network elements included in the communication system, and a connection relationship between the network elements are not limited thereto.

In the embodiments of this application, the communication system may be a communication system that supports a fourth generation (4G) access technology, for example, a long term evolution (LTE) access technology. Alternatively, the communication system may be a communication system that supports a 5G access technology, for example, a new radio (NR) access technology. Alternatively, the communication system may be a communication system that supports a plurality of radio technologies, for example, a communication system that supports an LTE technology and an NR technology. In addition, the communication system is also applicable to a future-oriented communication technology.

The network device in the embodiments of this application may be a device that is on an access network side and that is configured to support a terminal in accessing a communication system, and may be, for example, an evolved NodeB (eNB) in a communication system that supports a 4G access technology, or a next generation NodeB (gNB), a transmission reception point (TRP), a relay node, an access point (AP), or the like in a communication system that supports a 5G access technology. The network device may be referred to as a base station, a node, an access network device, or the like.

The terminal in the embodiments of this application may be a device that provides a user with voice or data connectivity, and the terminal may also be referred to as user equipment (UE), a mobile station, a subscriber unit, a station, terminal equipment (TE), or the like. For example, the terminal may be a cellular phone, a personal digital assistant (PDA), a wireless modem, a handheld device, a laptop computer, a cordless phone, a wireless local loop (WLL) station, a pad, a smartphone, customer premise equipment (CPE), or a sensor with a network access function. With development of wireless communication technologies, any device that can access the communication system, any device that can communicate with a network side in the communication system, or any device that can communicate with another object by using the communication system may be the terminal in the embodiments of this application, such as a terminal and a vehicle in intelligent transportation, a household device in a smart household, an electricity meter reading instrument or a voltage monitoring instrument in a smart grid, an environment monitoring instrument, a video surveillance instrument in an intelligent security network, or a cash register.

For ease of understanding of the embodiments of this application, the following first briefly describes related terms in this specification.

1. Slot

A slot is a minimum scheduling unit of a time domain resource, and one slot includes at least one symbol. Symbols include an uplink symbol (that is, a symbol used for uplink transmission), a downlink symbol (that is, a symbol used for downlink transmission), and a flexible symbol (which may be used for uplink transmission or downlink transmission or as a guard interval depending on a network configuration). A slot in which all included symbols are uplink symbols may be referred to as an uplink slot, and is represented by U in the embodiments of this application. A slot in which all included symbols are downlink symbols may be referred to as a downlink slot, and is represented by D in the embodiments of this application. A slot in which included symbols are a plurality of symbols of an uplink symbol, a downlink symbol, and a flexible symbol may be referred to as a flexible slot, and is represented by S in the embodiments of this application.

In NR, according to different subcarrier spacings, one millisecond (ms) may include different quantities of slots. For example, when a subcarrier spacing is 15 kilohertz (kHz), 1 ms includes one slot, and the slot occupies 1 ms. When a subcarrier spacing is 30 kHz, 1 ms includes two slots, and each slot occupies 0.5 ms.

The uplink symbol may be referred to as, for example, a single carrier-frequency division multiple access (SC-FDMA) symbol or an orthogonal frequency division multiplexing (OFDM) symbol. The downlink symbol may be referred to as, for example, an OFDM symbol.

2. Time Division Duplex (TDD)

TDD is a duplex communication technology in a communication system, and is used to separate a receiving channel and a sending channel, that is, an uplink and a downlink. In a communication system using a TDD mode, a same frequency domain resource is used for an uplink and a downlink, and the uplink and the downlink are distinguished by using different time domain resources.

3. Frequency Division Duplex (FDD)

FDD is a duplex communication technology in a communication system, and is used to separate a receiving channel and a sending channel, that is, an uplink and a downlink. In a communication system using an FDD mode, a same time domain resource is used for an uplink and a downlink, and the uplink and the downlink are distinguished by using different frequency domain resources. For example, an uplink frequency range is different from a downlink frequency range.

4. Multi-Carrier Uplink Transmission

The multi-carrier uplink transmission means that a plurality of carriers exist between a terminal and a network device in an uplink direction. The terminal may access one network device, and the plurality of carriers may include a carrier between the terminal and the network device. Alternatively, the terminal may simultaneously access two network devices, and the plurality of carriers may include a carrier between the terminal and each of the two network devices.

For example, multi-carrier uplink transmission scenarios may include carrier aggregation (CA), dual connectivity (DC), supplementary uplink (SUL), and the like.

For example, during the multi-carrier uplink transmission, uplink transmission may be performed in time division multiplexing (time division multiplexing, TDM) mode, or uplink transmission may be performed in simultaneous transmission mode.

5. CA

Figure 2:
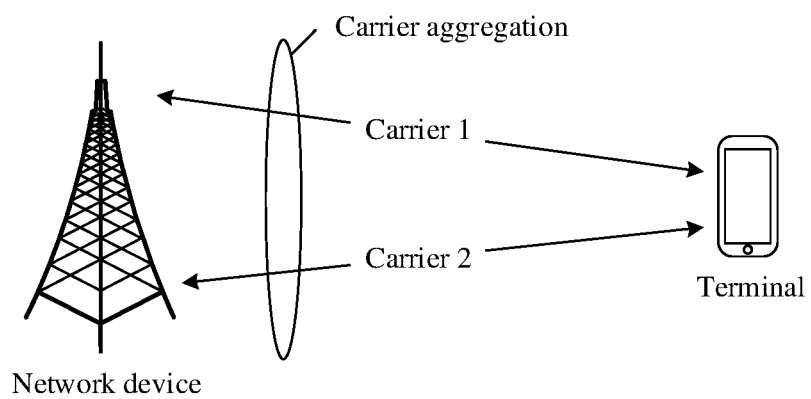
FIG. 2 is a schematic diagram of a carrier aggregation (CA) scenario.

CA is a technology that aggregates two or more carriers to support a larger transmission bandwidth. CA can be classified into uplink CA and downlink CA. For uplink CA, a terminal may simultaneously receive or transmit data on a plurality of carriers based on a capability of the terminal. For example, refer to FIG. 2. The terminal may perform uplink CA on a carrier 1 and a carrier 2, so that a larger uplink transmission bandwidth is supported between a network device and the terminal, and uplink transmission performance is improved.

6. DC

In a current communication system, a terminal is supported in simultaneously accessing two different nodes, and this access mode is referred to as DC. In this case, the terminal may perform transmission by using radio resources of one or both of the two nodes, and the two nodes may be of a same RAT (radio access technology) or different RATs.

One of the two different nodes is a primary node and the other is a secondary node. A link between the two nodes may be a non-ideal backhaul link, or may be an ideal backhaul link. The two different nodes may be different network devices, or may be different modules in a same network device, where one module may correspond to one cell.

For example, the two different nodes may be two base stations in an evolved packet core (EPC) non-standalone (Non-Standalone, NSA) networking scenario. In this case, the two base stations may be an LTE base station and an NR base station. Alternatively, the two different nodes may be two base stations in a standalone (Standalone, SA) networking scenario. In this case, both of the two base stations may be LTE base stations or NR base stations. A DC scenario in which both of the two base stations are NR base stations may be referred to as an NR DC scenario. A DC scenario in which both of the two base stations are LTE base stations may be referred to as an LTE DC scenario.

For example, DC may be multi-RAT (MR)-DC, and MR-DC may include evolved universal terrestrial radio access (E-UTRA)-NR DC (E-UTRA-NR Dual Connectivity, EN-DC), next generation (NG) radio access network (RAN) E-UTRA-NR DC (NG-RAN E-UTRA-NR Dual Connectivity, NGEN-DC), NR-E-UTRA DC (NR-E-UTRA Dual Connectivity, NE-DC), or NR-DC.

Figure 3:
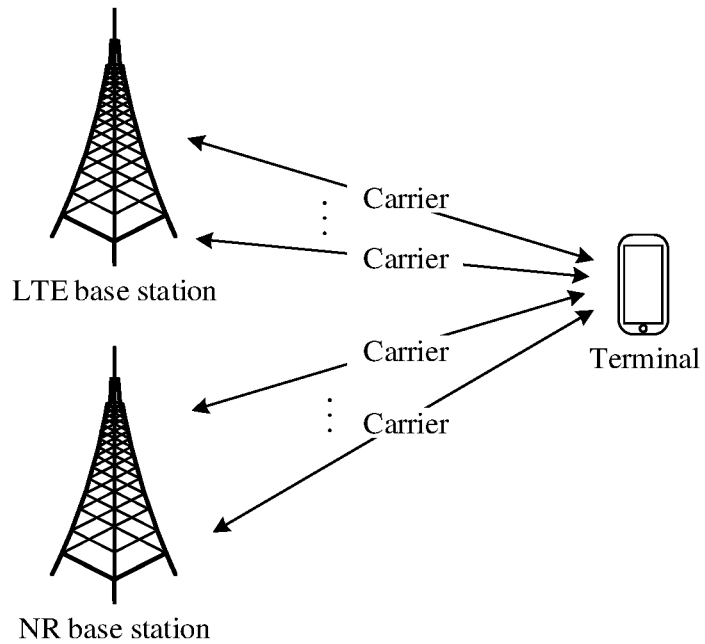
FIG. 3 is a schematic diagram of a dual connectivity (DC) scenario.

The terminal may communicate with one of the two different nodes by using a plurality of carriers. For example, refer to FIG. 3. If the two different nodes are an LTE base station and an NR base station, the terminal may communicate with the LTE base station by using a plurality of carriers, and uplink CA and/or downlink CA may be performed on the plurality of carriers. Alternatively, the terminal may communicate with the NR base station by using a plurality of carriers, and uplink CA and/or downlink CA may be performed on the plurality of carriers.

7. SUL

Figure 4:
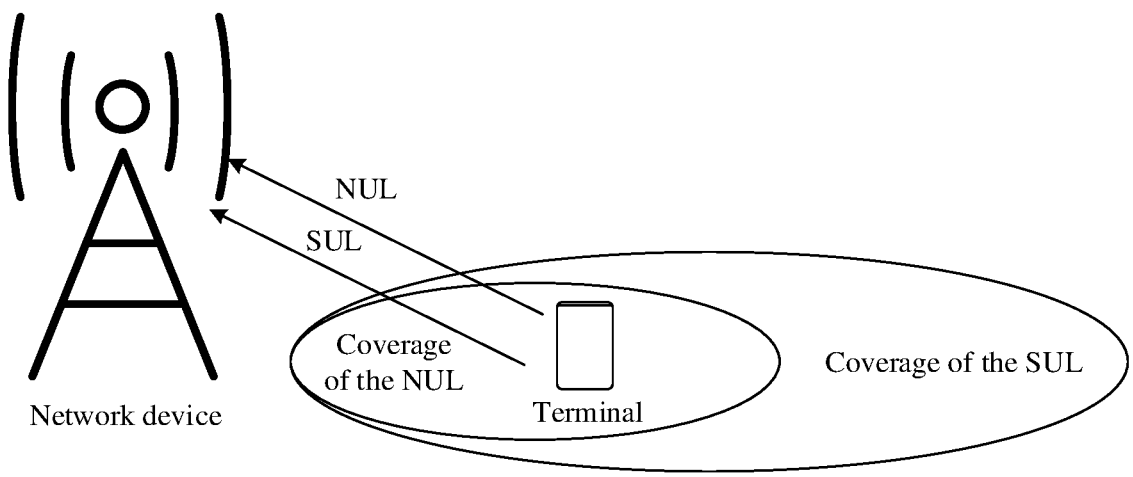
FIG. 4 is a schematic diagram of a supplementary uplink (SUL) scenario.

The SUL is configured for a terminal. The purpose is to improve uplink coverage of the terminal. For example, refer to FIG. 4. The terminal may send uplink information through a normal uplink (normal uplink, NUL), or may send uplink information through the SUL. A coverage area of the NUL may be smaller than a coverage area of the SUL. In the SUL scenario, a plurality of carriers are an SUL and an NUL.

8. Radio Frequency Capability

The radio frequency capability in the embodiments of this application includes a radio frequency channel capability and/or another radio frequency capability. The radio frequency channel capability may include one or more of the following information, including a quantity of multiple-input multiple-output (MIMO) layers, a sounding reference signal (SRS) antenna selection capability, a quantity of radio frequency channels, and the like. The another radio frequency capability may include one or more of the following information, including uplink transmit power, single-carrier power (ue-PowerClass), and information about whether transmitter switching affects a receiver (txSwitchImpactToRx).

9. Radio Frequency Channel Capability on a Carrier

A radio frequency channel capability on a carrier represents a quantity of radio frequency channels on the carrier. For example, a radio frequency channel capability supported on (or that can be used to a maximum extent for) a carrier represents a quantity of radio frequency channels supported on (or a maximum quantity of radio frequency channels that can be used for) the carrier.

The quantity of radio frequency channels on the carrier may be directly and explicitly indicated by using a value, or may be implicitly indicated by using a quantity of MIMO layers, an SRS antenna selection capability, or the like of the carrier. Therefore, the radio frequency channel capability on the carrier may include one or more of the following information, including a value indicating the quantity of radio frequency channels on the carrier, the quantity of MIMO layers of the carrier, the SRS antenna selection capability on the carrier, and the like. The radio frequency channel capability on the carrier may be represented by using information included in the radio frequency channel capability.

The SRS antenna selection capability refers to quantities of transmit antennas and receive antennas supported on the carrier. If the quantity of transmit antennas is denoted as x, the quantity of receive antennas is denoted as y, a transmit antenna is denoted as T, and a receive antenna is denoted as R, the SRS antenna selection capability on the carrier may be denoted as xTyR, where both x and y are integers greater than 0.

A quantity of MIMO layers of a carrier is the same as a quantity of radio frequency channels on the carrier. For example, a maximum quantity of MIMO layers of a carrier is the same as a quantity of radio frequency channels supported on the carrier. A quantity of transmit antennas in an SRS antenna selection capability on a carrier is the same as a quantity of radio frequency channels on the carrier. For example, a maximum quantity of transmit antennas in an SRS antenna selection capability on a carrier is the same as a quantity of radio frequency channels supported on the carrier.

For convenience, in the following descriptions, "the radio frequency channel capability represents x radio frequency channels" is described as "the radio frequency channel capability is xT", and x is an integer greater than 0.

10. Radio Frequency Channel Sharing Mechanism

One carrier may support one or more radio frequency channels. During actual implementation, different carriers may share a radio frequency channel, that is, a same radio frequency channel may be used for different carriers in different time periods. For example, refer to FIG. 5. A carrier 1 may support a radio frequency channel 1 and a radio frequency channel 2, and a carrier 2 supports only the radio frequency channel 2. The radio frequency channel 2 may be used for different carriers in different time periods. For example, in a time period 1, the radio frequency channel 2 may be used for the carrier 1. In this case, in the time period 1, a switch 1 works in a state 1. In a time period 2, the radio frequency channel 2 may be used for the carrier 2. In this case, in the time period 2, the switch 1 works in a state 2.

11. Single Transmission on a Carrier

Single transmission on a carrier means that uplink transmission is performed only on one carrier.

There may be two cases of single transmission on a carrier. One case is single-carrier transmission, that is, a terminal always performs uplink transmission on the carrier. The other case is TDM transmission on the carrier and other carriers. In this case, time domain resources used for uplink transmission on the carrier and any one of the other carriers do not overlap. For the carrier, single transmission is performed on the carrier. For a plurality of carriers including the carrier and the other carriers, TDM transmission is performed on the plurality of carriers.

When a terminal performs transmission on a plurality of carriers in TDM mode, a time domain resource used for uplink transmission on each of the plurality of carriers does not overlap a time domain resource used for uplink transmission on any other carrier in the plurality of carriers. The plurality of carriers may be some or all of carriers supported by the terminal. It may be understood that uplink transmission on the plurality of carriers is performed by using different time domain resources.

Figures 5, 6, 7:
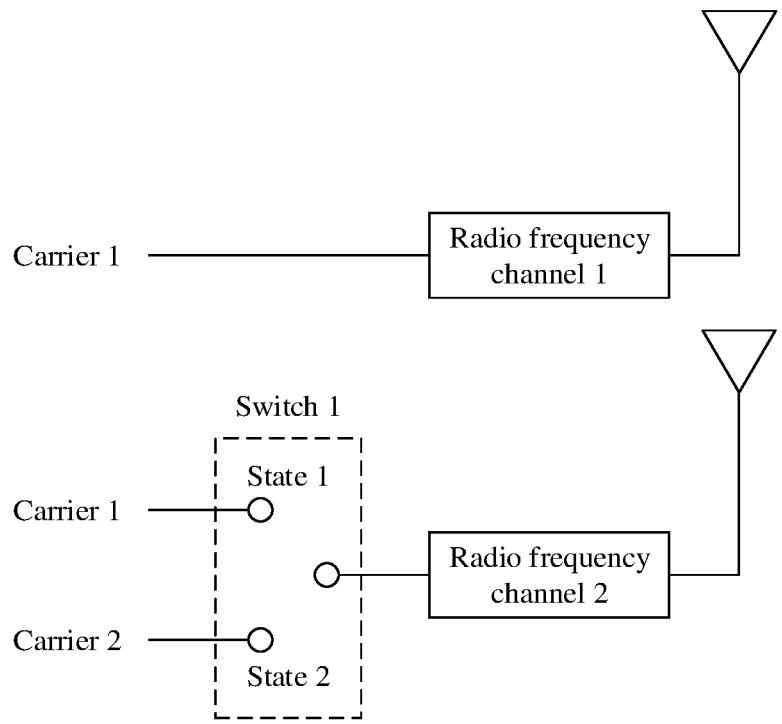

For example, for a 2.6 gigahertz (GHz) carrier (2.6G carrier for short) and a 3.5 GHz carrier (3.5G carrier for short), if slot configurations of the two carriers are shown in FIG. 6, the terminal may perform uplink transmission on the 2.6G carrier in a slot 3 corresponding to the 2.6G carrier, and may perform uplink transmission on the 3.5G carrier in a slot 9 corresponding to the 3.5G carrier and a slot 4 corresponding to the 3.5G carrier (that is, the first half slot of a slot 2 corresponding to the 2.6G carrier). In this case, TDM transmission is performed on the 2.6G and 3.5G carrier.

The TDM mode may also be referred to as a time-division transmission mode, or the like.

In the embodiments of this application, single transmission on a carrier may include single-carrier transmission and/or TDM transmission on the carrier and another carrier.

12. Radio Frequency Capability Used on a Carrier in the Case of Single Transmission on the Carrier A radio frequency capability used on a carrier in the case of single transmission on the carrier includes a radio frequency capability used on the carrier in the case of single-carrier transmission, and/or a radio frequency capability used on the carrier in the case of TDM transmission on the carrier and another carrier. A radio frequency capability used on a carrier in the case of single-carrier transmission may be the same as or different from a radio frequency capability used on the carrier in the case of TDM transmission on the carrier and another carrier.

13. Simultaneous Transmission on a Plurality of Carriers

Simultaneous transmission is a data transmission mode. When a terminal performs simultaneous transmission on a plurality of carriers, a time domain resource used for uplink transmission on each of the plurality of carriers overlaps a time domain resource used for uplink transmission on each of the other carriers. The plurality of carriers may be some or all of carriers supported by the terminal.

For example, refer to FIG. 6. In the first half slot of the slot 2 corresponding to the 2.6G carrier (that is, the slot 4 corresponding to the 3.5G carrier), the terminal simultaneously performs uplink transmission on the 2.6G carrier and the 3.5G carrier. In this case, in the first half slot of the slot 2 corresponding to the 2.6G carrier (that is, the slot 4 corresponding to the 3.5G carrier), the 2.6G carrier and the 3.5G carrier are used for simultaneous transmission.

It should be noted that, for an uplink time domain resource overlapped for a plurality of carriers, whether TDM transmission or simultaneous transmission is performed on the plurality of carriers can be determined depending on how transmission is performed on the plurality of carriers by using the overlapping uplink time domain resource. For example, for a 2.6G carrier and a 3.5G carrier, slot configurations of the two carriers are shown in FIG. 7. If the terminal performs transmission by using the 3.5G carrier in a slot 4 and a slot 9 corresponding to the 3.5G carrier, and the terminal performs transmission by using the 2.6G carrier only in a slot 3 corresponding to the 2.6G carrier, uplink transmission is performed on the 3.5G carrier and the 2.6G carrier in TDM mode. If the terminal performs transmission by using the 3.5G carrier in the slot 4 and the slot 9 corresponding to the 3.5G carrier, and the terminal performs transmission by using the 2.6G carrier in a slot 2, the slot 3, and a slot 4 corresponding to the 2.6G carrier, in the slot 4 and the slot 9 corresponding to the 3.5G carrier, the 3.5G carrier and the 2.6G carrier are used for simultaneous transmission.

In addition, it should be noted that the terminal may support a plurality of carriers, and in the plurality of carriers, some carriers may be used for TDM transmission, and some carriers may be used for simultaneous transmission. For example, as shown in FIG. 8, the terminal performs transmission on a 3.5G carrier in a slot 4 and a slot 9 corresponding to the 3.5G carrier, performs transmission on a 2.6G carrier in a slot 3 corresponding to the 2.6G carrier, and performs transmission on a 1.8G carrier in a slot 0 to a slot 4 corresponding to the 1.8G carrier. In this case, TDM transmission is performed on the 3.5G carrier and the 2.6G carrier, simultaneous transmission is performed on the 3.5G carrier and the 1.8G carrier in the slot 4 and the slot 9 corresponding to the 3.5G carrier, and simultaneous transmission is performed on the 2.6G carrier and the 1.8G carrier in the slot 3 corresponding to the 2.6G carrier.

14. Radio Frequency Channel Capability Supported on Each of a Plurality of Carriers in the Case of Simultaneous Transmission on the Plurality of Carriers It may be understood that there is at least one moment at which simultaneous transmission is performed on a plurality of carriers, and at the moment, a radio frequency channel capability supported on each carrier is a radio frequency channel capability supported on the carrier in the case of simultaneous transmission on the plurality of carriers.

It should be noted that, when a terminal reports the radio frequency channel capability supported on each carrier in the case of simultaneous transmission on the plurality of carriers, a network device and the terminal may not determine a moment at which simultaneous transmission is performed on the plurality of carriers, and may perform scheduling on all time domain resources based on the radio frequency channel capability supported on each carrier in the case of simultaneous transmission on the carriers.

For example, at a moment t1, simultaneous transmission is performed on a carrier 1 and a carrier 2, the carrier 1 supports 1T, and the carrier 2 supports 1T. In this case, when simultaneous transmission is performed on the carrier 1 and the carrier 2, the carrier 1 supports 1T, and the carrier 2 supports 1T. The network device may perform scheduling on all time domain resources based on that the carrier 1 supports 1T and the carrier 2 supports 1T.

Currently, in some solutions, the network device may send a radio frequency channel capability on one or more carriers to the terminal based on a radio frequency channel capability on each carrier in a relatively long time, and performs uplink transmission on the one or more carriers based on the radio frequency channel capability on the one or more carriers. An uplink transmission capability of the terminal is limited. For example, refer to FIG. 5. The carrier 1 supports the radio frequency channel 1 and the radio frequency channel 2, and the carrier 2 supports the radio frequency channel 2. The carrier 1 is a 2.6G carrier, and the carrier 2 is a 3.5G carrier. For slot configurations of the 2.6G carrier and the 3.5G carrier, refer to FIG. 6. If the network device indicates, in a slot 3 of the 3.5G carrier, the terminal to use 1T on the 3.5G carrier, and indicates the terminal to use 1T on the 2.6G carrier, the terminal performs uplink transmission in a slot 4 and a slot 9 of the 3.5G carrier by using 1T, and performs uplink transmission in a slot 2 and a slot 3 of the 2.6G carrier by using 1T. Actually, because the 2.6G carrier supports 2T, the terminal may perform uplink transmission in the slot 3 of the 2.6G carrier by using 2T. It can be learned that an uplink transmission capability of the terminal is limited in an existing method.

To improve an uplink transmission capability of a terminal, the embodiments of this application provide the following methods described in Embodiment 1 to Embodiment 3. In Embodiment 1 and Embodiment 3, a network device may flexibly indicate a radio frequency channel capability of a terminal on one or more carriers. In Embodiment 2, a terminal may determine a radio frequency channel capability on one or more carriers based on a status of uplink scheduling performed by a network device on each carrier. In Embodiment 1 to Embodiment 3, the radio frequency channel capability of the terminal on the one or more carriers may be flexibly adjusted, to improve an uplink transmission capability of the terminal.

The method provided in the embodiments of this application may be applied to any multi-carrier scenario. In this case, a terminal may be located in an overlapping coverage area of a plurality of carriers, and the terminal may select different carriers for uplink transmission. The multi-carrier scenario includes but is not limited to any one of the foregoing DC scenario, CA scenario, or SUL scenario.

The carrier in the embodiments of this application may be an FDD carrier, or may be a TDD carrier.

The carrier in the embodiments of this application may be, for example, a 3.5G carrier, a 2.6G carrier, a 1.8G carrier, or a 900 mega (M) carrier.

Embodiment 1

Embodiment 1 provides a radio frequency capability configuration method. As shown in FIG. 9, the method includes the following steps.

901. A terminal sends capability information of the terminal to a network device.

Correspondingly, the network device receives the capability information of the terminal from the terminal.

The capability information may include a plurality of radio frequency capabilities.

Optionally, the capability information of the terminal includes information about a radio frequency capability used on a first carrier in the case of single transmission on the first carrier.

Optionally, the capability information of the terminal further includes information about a radio frequency capability used on a first carrier in the case of simultaneous transmission on the first carrier and one or more carriers other than the first carrier.

Optionally, the capability information of the terminal further includes information about a radio frequency capability used on each of the one or more carriers in the case of simultaneous transmission on the first carrier and the one or more carriers other than the first carrier.

It may be understood that the capability information of the terminal includes information about a radio frequency capability used on each of one or more carriers in N (where N is an integer greater than 1) carriers in the case of single transmission on each of the one or more carriers, and information about a radio frequency capability used on each of a plurality of carriers in the N carriers in the case of simultaneous transmission on the plurality of carriers. The N carriers are some or all carriers of the terminal. The N carriers include the first carrier.

That is, in addition to the information about the radio frequency capability used on the first carrier in the case of single transmission on the first carrier, and the information about the radio frequency capability used on the first carrier and the information about the radio frequency capability used on each of the one or more carriers other than the first carrier in the case of simultaneous transmission on the first carrier and the one or more carriers, the capability information of the terminal further includes information about a radio frequency capability used on each of the one or more carriers other than the first carrier in the N carriers in the case of single transmission on each of the one or more carriers, and/or information about a radio frequency capability used on each of a plurality of carriers in the N carriers excluding the first carrier in the case of simultaneous transmission on the plurality of carriers.

As an optional implementation, in Embodiment 1 to Embodiment 3 of this application, when reporting a radio frequency capability on each carrier in a frequency band combination, the terminal may explicitly indicate whether single transmission is performed on one carrier or simultaneous transmission is performed on the carrier and one or more other carriers.

As another optional implementation, in Embodiment 1 to Embodiment 3 of this application, when reporting a radio frequency capability on each carrier in a carrier combination, the terminal may indicate whether the reported radio frequency capability is a radio frequency capability used on each carrier in the case of single transmission on the carrier or a radio frequency capability used on each of a plurality of carriers in the case of simultaneous transmission on the plurality of carriers. The terminal and the network device may determine, depending on whether time domain resources of the plurality of carriers overlap, whether the radio frequency capability reported by the terminal is the radio frequency capability used on each carrier in the case of single transmission on the carrier or the radio frequency capability used on each of the plurality of carriers in the case of simultaneous transmission on the plurality of carriers. For example, when the time domain resources of the plurality of carriers overlap, the radio frequency capability on each carrier reported by the terminal is the radio frequency capability used on each of the plurality of carriers in the case of simultaneous transmission on the plurality of carriers, when the time domain resources of the plurality of carriers do not overlap, the radio frequency capability on each carrier reported by the terminal is the radio frequency capability used on each carrier in the case of single transmission on the carrier.

Optionally, a radio frequency capability used on a carrier in the case of single transmission on the carrier includes a radio frequency capability used on the carrier in the case of single-carrier transmission, and/or a radio frequency capability used on the carrier in the case of TDM transmission on the carrier and another carrier.

Optionally, when transmission on the carrier is transmission on the single carrier, the reported capability is a capability on the carrier. For example, a carrier A supports 2T.

Optionally, when TDM transmission is performed on the carrier and the another carrier, a capability in a frequency band combination may be reported. For example, the frequency band combination includes a frequency band A and a frequency band B, a carrier A supports 2T, and a carrier B supports 2T. Time domain resources of the carrier A and the carrier B do not overlap, and the terminal and the network device may consider the capability in the frequency band combination as a capability on the carrier A and a capability on the carrier B in TDM mode.

Optionally, when simultaneous transmission is performed on the carrier and the another carrier, a capability in a frequency band combination may be reported. For example, the frequency band combination includes a frequency band A and a frequency band B, a carrier A supports 1T, and a carrier B supports 1T. Time domain resources of the carrier A and the carrier B overlap, and the terminal and the network device may consider the capability in the frequency band combination as a capability on the carrier A and a capability on the carrier B in simultaneous transmission mode.

Figure 10:
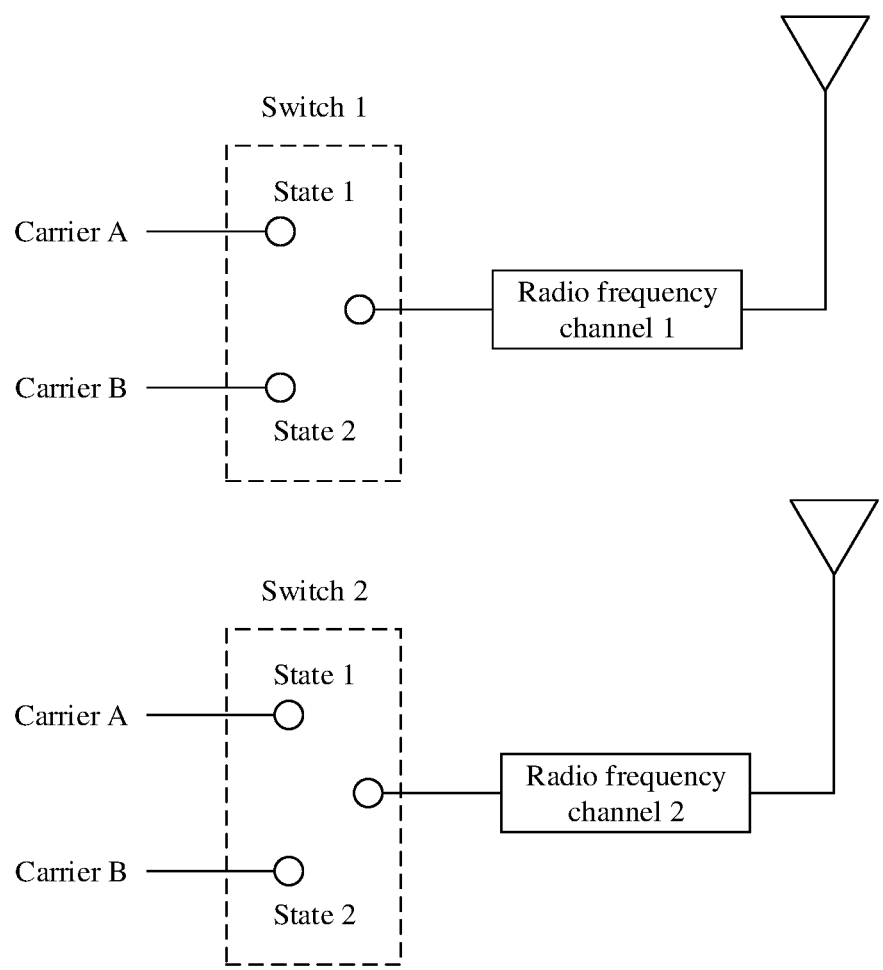
FIG. 10 and FIG. 11 are each a schematic diagram of a radio frequency channel according to an embodiment of this application.
Figure 11:
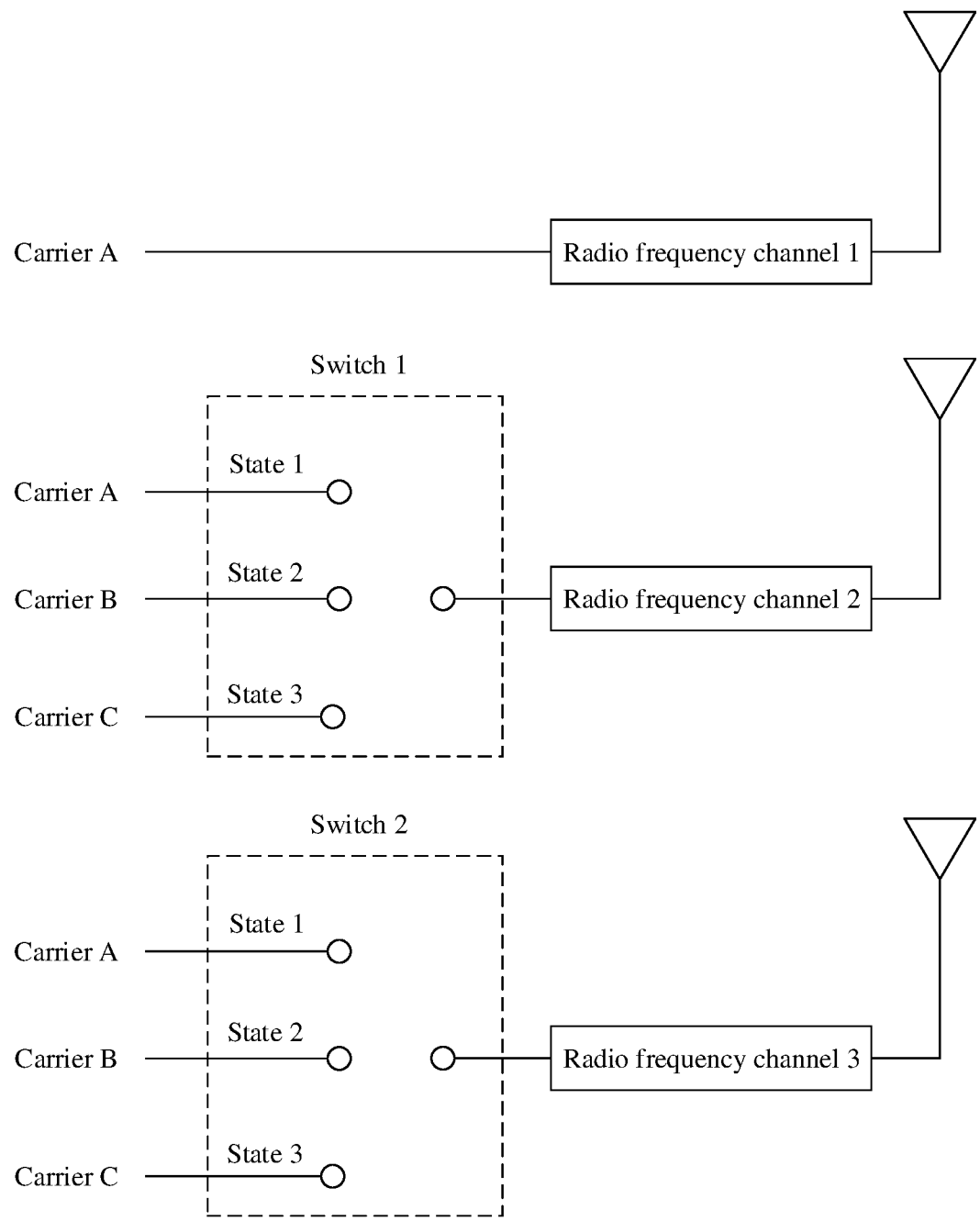

Example 1: It is assumed that the N carriers are a carrier A and a carrier B. Refer to FIG. 10. Both the carrier A and the carrier B support a radio frequency channel 1 and a radio frequency channel 2. In this case, the carrier A supports a maximum of 2T in the case of single transmission on the carrier A. The carrier B supports a maximum of 2T in the case of single transmission on the carrier B. Both the carrier A and the carrier B support 1T in the case of simultaneous transmission on the carrier A and the carrier B. In this case, for information included in the capability information of the terminal, refer to Table 1.

TABLE 1

| Carrier | Radio frequency capability in single transmission | Radio frequency capability in simultaneous transmission on the carrier A and the carrier B |
|---------|---------------------------------------------------|--------------------------------------------------------------------------------------------|
| A       | 2T                                                | 1T                                                                                         |
| B       | 2T                                                | 1T                                                                                         |

Example 2: It is assumed that the N carriers are a carrier A, a carrier B, and a carrier C. Refer to FIG. 1*i*, the carrier A supports a radio frequency channel 1, a radio frequency channel 2, and a radio frequency channel 3, and both the carrier B and the carrier C support the radio frequency channel 2 and the radio frequency channel 3. In this case, the carrier A supports a maximum of 3T in the case of single transmission on the carrier A. The carrier B supports a maximum of 2T in the case of single transmission on the carrier B. The carrier C supports a maximum of 2T in the case of single transmission on the carrier C. When simultaneous transmission is performed on the carrier A and the carrier B, the carrier A supports a maximum of 2T and the carrier B supports a maximum of 1T, or the carrier A supports a maximum of 1T and the carrier B supports a maximum of 2T. When simultaneous transmission is performed on the carrier A and the carrier C, the carrier A supports a maximum of 2T and the carrier C supports a maximum of 1T, or the carrier A supports a maximum of 1T and the carrier C supports a maximum of 2T. When simultaneous transmission is performed on the carrier B and the carrier C, the carrier B supports a maximum of 1T and the carrier C supports a maximum of 1T. When simultaneous transmission is performed on the carrier A, the carrier B, and the carrier C, the carrier A supports a maximum of 1T, the carrier B supports a maximum of 1T, and the carrier C supports a maximum of 1T. In this case, for information included in the capability information of the terminal, refer to Table 2.

TABLE 2

| Transmission mode | Radio frequency capability on A | Radio frequency capability on B | Radio frequency capability on C |
|---|---|---|---|
| Single transmission on A | 3T | — | — |
| Single transmission on B | — | 2T | — |
| Single transmission on C | — | — | 2T |
| Simultaneous transmission on A and B | 2T | 1T | — |
| Simultaneous transmission on A and C | 2T | — | 1T |
| Simultaneous transmission on B and C | — | 1T | 1T |
| Simultaneous transmission on A, B, and C | 1T | 1T | 1T |

When the method provided in Embodiment 1 is applied to a DC scenario, the network device may be a primary network device, or may be a secondary network device. The first carrier may be a carrier between the terminal and the primary network device, or may be a carrier between the terminal and the secondary network device.

Step 901 is an optional step. For example, the terminal and the network device may preconfigure a capability of the terminal. In this case, the terminal may not need to report the capability to the network device.

Optionally, the capability information of the terminal further includes information indicating whether the terminal supports dynamic switching between radio frequency capabilities. If the terminal supports dynamic switching between radio frequency capabilities, the terminal may switch between a plurality of radio frequency capabilities on one carrier.

902. The network device sends configuration information to the terminal, where the configuration information is used to configure a plurality of radio frequency capabilities that are on the first carrier, and the plurality of radio frequency capabilities are in a one-to-one correspondence with a plurality of indexes.

Correspondingly, the terminal receives the configuration information from the network device.

Optionally, the plurality of radio frequency capabilities on the first carrier include the radio frequency capability used on the first carrier in the case of single transmission on the first carrier.

Optionally, the configuration information is carried in radio resource control (RRC) signaling. For example, for one carrier, the network device may configure one or more radio frequency capabilities on a carrier by using an information element uplink configuration identifier ("UplinkConfig-Id") included in a sequence (sequence) of an information element uplink configuration list ("uplinkConfigList") in section 6.3.2 in 3GPP technical specification (technical specification, TS) 38.331 version (version, V) 15.5.0. Further, if the carrier has an SUL, one or more radio frequency capabilities on the SUL may be further configured by using an information element "UplinkConfig-Id" included in a sequence of an information element supplementary uplink list ("supplementaryUplinkList"). One value of Id in "UplinkConfig-Id" is used to configure one radio frequency capability. For example, information included in "uplinkConfigList" may be as follows:

```
uplinkConfigList           SEQUENCE (SIZE (1..maxNrofNulConfig)) OF
UplinkConfig -Id OPTIONAL, -- Need M
    supplementaryUplinkList   SEQUENCE (SIZE (1..maxNrofSulConfig)) OF
UplinkConfig-Id   OPTIONAL, -- Need M
    UplinkConfig ::=         SEQUENCE{
    UplinkConfig-Id
    ......
    }
```

Optionally, the plurality of radio frequency capabilities on the first carrier include the radio frequency capability used on the first carrier in the case of simultaneous transmission on the first carrier and the one or more carriers other than the first carrier. When simultaneous transmission is performed on one carrier and different carriers, radio frequency capabilities on the carrier may also be different. For example, refer to Table 2. The carrier A supports 2T when simultaneous transmission is performed on the carrier A and the carrier B, and the carrier A supports 1T when simultaneous transmission is performed on the carrier A, the carrier B, and the carrier C. It can be learned that the first carrier may support one or more radio frequency capabilities in the case of simultaneous transmission on the first carrier and the one or more carriers other than the first carrier.

Optionally, the configuration information is used to configure radio frequency capabilities on N' (where N' is an integer greater than 0) carriers, at least one of the N' carriers is configured with a plurality of radio frequency capabilities, and each radio frequency capability on each of the N' carriers corresponds to one index. Indexes corresponding to a plurality of radio frequency capabilities on one carrier are different, and indexes corresponding to radio frequency capabilities on different carriers may be the same or different. The N' carriers include the first carrier, and the N' carriers belong to the N carriers. N' may be the same as N, or may be less than N. In this embodiment of this application, N=N' is used as an example to describe the method provided in this embodiment of this application.

In other words, in addition to configuring the plurality of radio frequency capabilities on the first carrier, the configuration information is further used to configure one or more radio frequency capabilities on each of the N' carriers except the first carrier. A plurality of radio frequency capabilities on any carrier may include a radio frequency capability used on the carrier in the case of single transmission on the carrier, and may further include a radio frequency capability used on the carrier in the case of simultaneous transmission on the carrier and one or more carriers other than the carrier.

If step 901 is performed, during specific implementation, step 902 may include: The network device sends the configuration information to the terminal based on the capability information of the terminal. Specifically, based on the capability information reported by the terminal, the network device may first determine a radio frequency capability used on each carrier in the case of single transmission on the carrier and a radio frequency capability used on each carrier in the case of simultaneous transmission on the carrier and different carriers, and then determine a total quantity of radio frequency capabilities on each carrier.

If step 901 is not performed, the configuration information may be preconfigured in the network device, or directly obtained by the network device from another device.

Based on the foregoing example 1, that the radio frequency capability includes only a radio frequency channel capability is used as an example. If the N' carriers are the carrier A and the carrier B, the carrier A supports 2T and 1T, and the carrier B supports 2T and 1T, for the radio frequency channel capabilities on the N' carriers configured in the configuration information, and indexes corresponding to the radio frequency channel capabilities, refer to Table 3.

TABLE 3

| Carrier | Index | |
|---------|-------|------|
|         | 0     | 1    |
| A       | 2T    | 1T   |
| B       | 2T    | 1T   |

Based on the foregoing example 2, that the radio frequency capability includes only a radio frequency channel capability is used as an example. If the N' carriers are the carrier A, the carrier B, and the carrier C, the carrier A supports 3T, 2T, and 1T, the carrier B supports 2T and 1T, and the carrier C supports 2T and 1T, for the radio frequency channel capabilities on the N' carriers configured in the configuration information, and indexes corresponding to the radio frequency channel capabilities, refer to Table 4.

TABLE 4

| Carrier | Index | | |
|---|---|---|---|
| | 0 | 1 | 2 |
| A | 3T | 2T | 1T |
| B | 2T | 1T | — |
| C | 2T | 1T | — |

Optionally, the network device may perform step 902 when the terminal supports dynamic switching between radio frequency capabilities.

903. The network device sends first indication information to the terminal, where the first indication information is used to indicate a first index, and the first index is one of the plurality of indexes. Correspondingly, the terminal receives the first indication information from the network device.

Optionally, the first indication information is used to indicate n1 indexes, the n1 indexes correspond to n1 carriers in the N' carriers, the n1 indexes include the first index, and n1 is an integer greater than 0 and less than or equal to N'. In other words, in addition to indicating the first index, the first indication information is further used to indicate other indexes in the n1 indexes except the first index.

For example, refer to Table 4. The first indication information may indicate an index 2 corresponding to the carrier A and an index 1 corresponding to the carrier B. The first index may be the index 2 corresponding to the carrier A or the index 1 corresponding to the carrier B.

Optionally, the first indication information is carried in media access control (MAC) control element (CE) signaling or downlink control information (DCI).

For example, a field used to indicate an index of a carrier may be added to the MAC CE signaling or the DCI. The field may include one or more bits (bits). For example, a name of the field may be uplink configuration indication (uplinkconfigindication).

Optionally, during specific implementation, step 903 may include 903-*a*. The network device sends the first indication information to the terminal based on uplink scheduling statuses on the first carrier and the one or more carriers other than the first carrier.

During specific implementation, in step 903-*a*, the network device may determine, based on locations of uplink scheduling time domain resources of the first carrier and the one or more carriers, that single transmission is performed on the first carrier or that simultaneous transmission is performed on the first carrier and the one or more carriers. Specifically, the network device may determine, based on overlapping of the uplink scheduling time domain resources of the first carrier and the one or more carriers, that single transmission is performed on the first carrier or that simultaneous transmission is performed on the first carrier and which carriers.

For a segment of uplink scheduling time domain resources (for example, a plurality of uplink slots, one uplink slot, or several uplink symbols) of the first carrier, a method used by the network device to determine whether single transmission is performed on the first carrier or simultaneous transmission is performed on the first carrier and the one or more carriers may be as follows. If the segment of uplink scheduling time domain resources do not overlap an uplink scheduling time domain resource of any carrier, the network device may determine that the terminal performs single transmission on the first carrier on the segment of uplink scheduling time domain resources of the first carrier. If the segment of uplink scheduling time domain resources overlap uplink scheduling time domain resources of one or more other carriers (for example, two carriers), the network device may determine that the terminal performs simultaneous transmission on the first carrier and one or more (for example, one or both of two carriers) of the one or more other carriers (for example, the two carriers) on the segment of uplink scheduling time domain resources of the first carrier.

After determining that single transmission is performed on the first carrier or that simultaneous transmission is performed on the first carrier and which carriers, the network device determines which radio frequency capability on the first carrier is indicated.

For example, when the network device determines that single transmission is performed on the first carrier, the first indication information indicates the radio frequency capability used on the first carrier in the case of single transmission on the first carrier, that is, a radio frequency capability corresponding to the first index is the radio frequency capability used on the first carrier in the case of single transmission on the first carrier.

For example, when the network device determines that simultaneous transmission is performed on the first carrier and the one or more carriers, the first indication information indicates the radio frequency capability used on the first carrier in the case of simultaneous transmission on the first carrier and the one or more carriers, that is, a radio frequency capability corresponding to the first index is the radio frequency capability used on the first carrier in the case of simultaneous transmission on the first carrier and the one or more carriers. Further, if there are a plurality of radio frequency capabilities used on the first carrier in the case of simultaneous transmission on the first carrier and different carriers, when the network device determines that simultaneous transmission is performed on the first carrier and the one or more carriers, the first indication information specifically indicates that a radio frequency capability on the first carrier depends on which carriers the one or more carriers are. In this case, the network device may determine the radio frequency capability on the first carrier based on the capability information reported by the terminal.

Figures 12, 13:
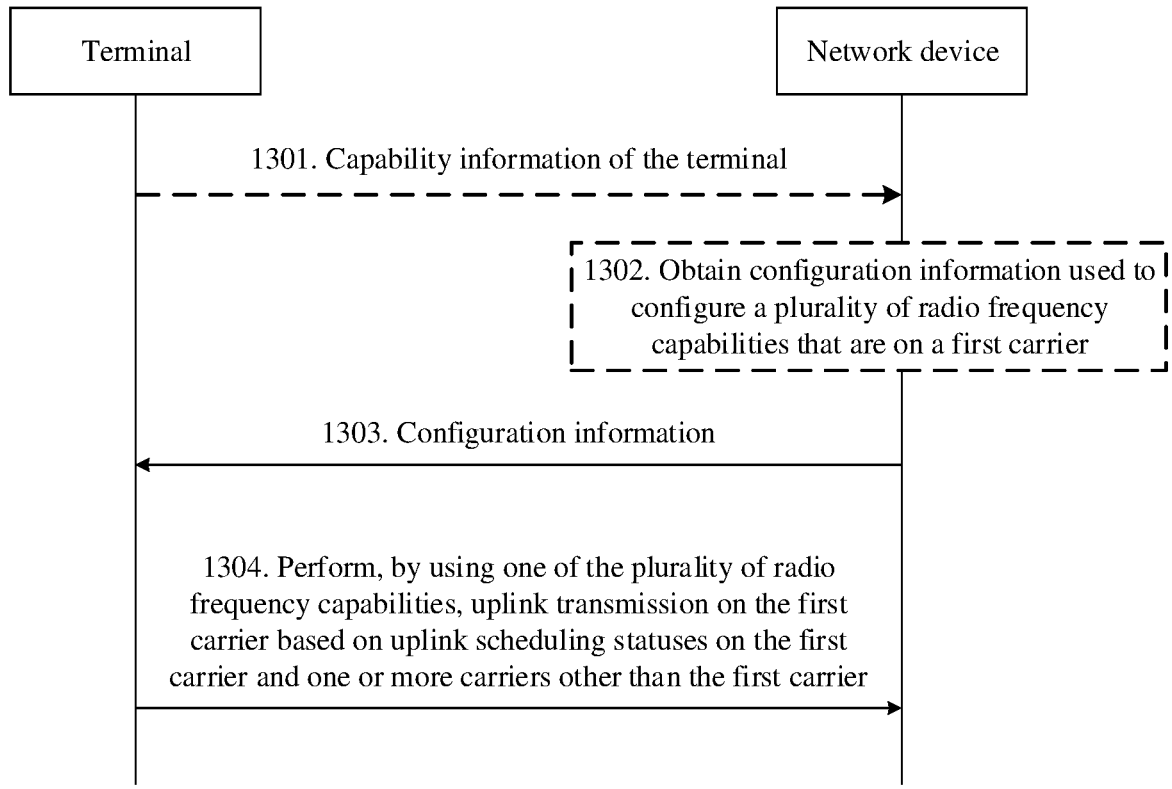
FIG. 12 is a schematic diagram of a slot configuration according to an embodiment of this application.
FIG. 13 and FIG. 14 are each a flowchart of a radio frequency capability configuration method according to an embodiment of this application.

For example, based on the example shown in Table 2, uplink scheduling time domain resources of the network device on the carrier 1, the carrier 2, and the carrier 3 are shown in FIG. 12. The network device determines and indicates that the terminal performs single transmission on the carrier 3 in an uplink slot 0 of the carrier 3, and that a radio frequency channel capability used on the carrier 3 in the case of single transmission on the carrier 3 is 2T. The network device determines and indicates that the terminal performs simultaneous transmission on the carrier 1, the carrier 2, and the carrier 3 in a slot 4 of the carrier 1 (that is, the first half slots of uplink slots 2 of the carrier 2 and the carrier 3), and that radio frequency channel capabilities used on the carrier 1, the carrier 2, and the carrier 3 in the case of simultaneous transmission on the carrier 1, the carrier 2, and the carrier 3 are all 1T. The network device determines and indicates that the terminal performs simultaneous transmission on the carrier 2 and the carrier 3 in the last half slots of the uplink slots 2 of the carrier 2 and the carrier 3, and that radio frequency channel capabilities used on the carrier 2 and the carrier 3 in the case of simultaneous transmission on the carrier 2 and the carrier 3 are both 1T.

A process in which the network device determines each of the n1 indexes indicated by the first indication information is similar to the process in which the network device determines the first index.

904. The terminal performs uplink transmission on the first carrier by using the radio frequency capability corresponding to the first index.

Optionally, for each of the n1 indexes except the first index, the terminal further performs, by using a radio frequency capability corresponding to the index, uplink transmission on a carrier corresponding to the index.

For example, refer to Table 4. If the first index is the index 2 corresponding to the carrier A, the terminal performs uplink transmission on the carrier A by using 1T. If the first indication information further indicates the index 1 corresponding to the carrier B, the terminal further performs uplink transmission on the carrier B by using 1T.

Step 904 is an optional step.

905. The network device sends second indication information to the terminal, where the second indication information is used to indicate a second index, and the second index is one of the plurality of indexes. Correspondingly, the terminal receives the second indication information from the network device.

Optionally, the second indication information is used to indicate n2 indexes, the n2 indexes correspond to n2 carriers in the N' carriers, the n2 indexes include the second index, and n2 is an integer greater than 0 and less than or equal to N'. In other words, in addition to indicating the second index, the second indication information is further used to indicate other indexes in the n2 indexes except the second index.

The first index and the second index may be the same or different. This is not specifically limited in this embodiment of this application. A process in which the network device determines each of the n2 indexes indicated by the second indication information is similar to the process in which the network device determines the first index. Details are not described again.

For example, refer to Table 4. The second indication information may indicate an index 1 corresponding to the carrier A and the index 1 corresponding to the carrier B. The second index may be the index 1 corresponding to the carrier A or the index 1 corresponding to the carrier B.

Optionally, the second indication information is carried in MAC CE signaling or DCI.

Optionally, the first indication information and the second indication information may be both carried in MAC CE signaling, or may be both carried in DCI, or one may be carried in MAC CE signaling and the other may be carried in DCI.

Embodiment 1 uses the first carrier as an example to describe a process in which the network device configures a radio frequency capability used on a carrier. Therefore, both the first indication information and the second indication information include an index corresponding to the radio frequency capability on the first carrier. During actual implementation, the carriers corresponding to the indexes indicated by the two pieces of indication information sent by the network device may include a same carrier, or may include different carriers. This is not specifically limited in this embodiment of this application.

Step 905 is an optional step.

906. The terminal performs uplink transmission on the first carrier by using a radio frequency capability corresponding to the second index.

Optionally, for each of the n2 indexes except the second index, the terminal further performs, by using a radio frequency capability corresponding to the index, uplink transmission on a carrier corresponding to the index.

For example, refer to Table 4. If the second index is the index 1 corresponding to the carrier A, the terminal performs uplink transmission on the carrier A by using 2T. If the second indication information further indicates the index 1 corresponding to the carrier B, the terminal further performs uplink transmission on the carrier B by using 1T.

Step 906 is an optional step.

According to the method provided in Embodiment 1, for one carrier, the network device may configure, for the terminal, a plurality of radio frequency capabilities that are on the carrier and that are in a one-to-one correspondence with a plurality of indexes, and then indicate an index by using indication information, so that the terminal can determine, by using the index, a to-be-used radio frequency capability in the plurality of radio frequency capabilities. The network device can flexibly indicate a radio frequency capability on a carrier by using an indicated index. In this way, on different time domain resources, the network device can indicate a radio frequency capability that is on a carrier to the terminal based on radio frequency capabilities used by the terminal on the carrier, thereby improving an uplink transmission capability of the terminal.

Embodiment 2

Embodiment 2 provides a radio frequency capability configuration method. A difference from Embodiment 1 mainly lies in that after a network device configures a plurality of radio frequency capabilities on a first carrier for a terminal, the terminal may select, based on statuses of uplink scheduling performed by the network device on the first carrier and one or more carriers other than the first carrier, one of the plurality of radio frequency capabilities on the first carrier to perform uplink transmission, without requiring the network device to indicate, to the terminal, a radio frequency capability used by the terminal on the first carrier.

As shown in FIG. 13, the radio frequency capability configuration method provided in Embodiment 2 includes the following steps.

1301. The terminal sends capability information of the terminal to the network device.

Correspondingly, the network device receives the capability information of the terminal from the terminal.

Optionally, the capability information of the terminal includes information about a radio frequency capability used on a first carrier in the case of single transmission on the first carrier.

Optionally, the capability information of the terminal further includes information about a radio frequency capability used on a first carrier in the case of simultaneous transmission on the first carrier and one or more carriers other than the first carrier.

Optionally, the capability information of the terminal further includes information about a radio frequency capability used on each of the one or more carriers in the case of simultaneous transmission on the first carrier and the one or more carriers other than the first carrier.

It may be understood that the capability information of the terminal includes information about a radio frequency capability used on each of one or more carriers in N (where N is an integer greater than 1) carriers in the case of single transmission on each of the one or more carriers, and information about a radio frequency capability used on each of a plurality of carriers in the N carriers in the case of simultaneous transmission on the plurality of carriers. The N carriers are some or all carriers of the terminal. The N carriers include the first carrier.

That is, in addition to the information about the radio frequency capability used on the first carrier in the case of single transmission on the first carrier, and the information about the radio frequency capability used on the first carrier and the information about the radio frequency capability used on each of the one or more carriers other than the first carrier in the case of simultaneous transmission on the first carrier and the one or more carriers, the capability information of the terminal further includes information about a radio frequency capability used on each of the one or more carriers other than the first carrier in the N carriers in the case of single transmission on each of the one or more carriers, and/or information about a radio frequency capability used on each of a plurality of carriers in the N carriers excluding the first carrier in the case of simultaneous transmission on the plurality of carriers.

For a specific example of the capability information of the terminal, refer to related descriptions in step 901. Details are not described herein again.

When the method provided in Embodiment 2 is applied to a DC scenario, the network device may be a primary network device, or may be a secondary network device. The first carrier may be a carrier between the terminal and the primary network device, or may be a carrier between the terminal and the secondary network device.

Step 1301 is an optional step. For example, the terminal and the network device may preconfigure a capability of the terminal. In this case, the terminal may not need to report the capability to the network device.

Optionally, the capability information of the terminal further includes information indicating whether the terminal supports dynamic switching between radio frequency capabilities. If the terminal supports dynamic switching between radio frequency capabilities, the terminal may switch between a plurality of radio frequency capabilities on one carrier.

1302. The network device obtains configuration information, where the configuration information is used to configure a plurality of radio frequency capabilities that are on the first carrier.

Optionally, the plurality of radio frequency capabilities on the first carrier are in a one-to-one correspondence with a plurality of indexes.

Optionally, the plurality of radio frequency capabilities on the first carrier include the radio frequency capability used on the first carrier in the case of single transmission on the first carrier.

Optionally, the plurality of radio frequency capabilities on the first carrier include the radio frequency capability used on the first carrier in the case of simultaneous transmission on the first carrier and the one or more carriers other than the first carrier. When simultaneous transmission is performed on one carrier and different carriers, radio frequency capabilities on the carrier may also be different. For example, refer to Table 2. The carrier A supports 2T when simultaneous transmission is performed on the carrier A and the carrier B, and the carrier A supports 1T when simultaneous transmission is performed on the carrier A, the carrier B, and the carrier C. It can be learned that the first carrier may support one or more radio frequency capabilities in the case of simultaneous transmission on the first carrier and the one or more carriers other than the first carrier.

Optionally, the configuration information is used to configure radio frequency capabilities on N' (where N' is an integer greater than 0) carriers, at least one of the N' carriers is configured with a plurality of radio frequency capabilities, and each radio frequency capability on each of the N' carriers corresponds to one index. Indexes corresponding to a plurality of radio frequency capabilities on one carrier are different, and indexes corresponding to radio frequency capabilities on different carriers may be the same or different. The N' carriers include the first carrier, and the N' carriers belong to the N carriers. N' may be the same as N, or may be less than N. In this embodiment of this application, N=N' is used as an example to describe the method provided in this embodiment of this application.

In other words, in addition to configuring the plurality of radio frequency capabilities on the first carrier, the configuration information is further used to configure one or more radio frequency capabilities on each of the N' carriers except the first carrier. A plurality of radio frequency capabilities on any carrier may include a radio frequency capability used on the carrier in the case of single transmission on the carrier, and may further include a radio frequency capability used on the carrier in the case of simultaneous transmission on the carrier and one or more carriers other than the carrier.

If step 1301 is performed, during specific implementation, in step 1302, the network device may obtain the configuration information based on the capability information of the terminal. Specifically, based on the capability information reported by the terminal, the network device may first determine a radio frequency capability used on each carrier in the case of single transmission on the carrier and a radio frequency capability used on each carrier in the case of simultaneous transmission on the carrier and different carriers, and then determine a total quantity of radio frequency capabilities on each carrier. For a specific example, refer to related descriptions in step 902.

If step 1301 is not performed, the configuration information may be preconfigured in the network device, or directly obtained by the network device from another device.

Step 1302 is an optional step.

1303. The network device sends the configuration information to the terminal. Correspondingly, the terminal receives the configuration information from the network device.

Optionally, the configuration information is carried in RRC signaling. For a specific example, refer to related descriptions in step 902. Details are not described herein again.

Optionally, the network device may perform step 1302 and step 1303 when the terminal supports dynamic switching between radio frequency capabilities.

1304. The terminal performs, by using one of the plurality of radio frequency capabilities, uplink transmission on the first carrier based on uplink scheduling statuses on the first carrier and the one or more carriers other than the first carrier.

During specific implementation, in step 1304, the terminal may determine, based on locations of uplink scheduling time domain resources of the first carrier and the one or more carriers, that single transmission is performed on the first carrier or that simultaneous transmission is performed on the first carrier and the one or more carriers. Specifically, the terminal may determine, based on overlapping of the uplink scheduling time domain resources of the first carrier and the one or more carriers, that single transmission is performed on the first carrier or that simultaneous transmission is performed on the first carrier and which carriers.

Specifically, the terminal may determine uplink scheduling time domain resources on different carriers based on DCI that is sent by the network device and that is used to schedule uplink data on the different carriers. For a segment of uplink scheduling time domain resources of the first carrier, a method used by the terminal to determine whether single transmission is performed on the first carrier or simultaneous transmission is performed on the first carrier and the one or more carriers is similar to that used by the network device. For details, refer to related descriptions in Embodiment 1. Details are not described herein again.

After determining that single transmission is performed on the first carrier or that simultaneous transmission is performed on the first carrier and which carriers, the terminal determines a radio frequency capability used on the first carrier.

For example, the terminal performs, when the terminal determines that single transmission is performed on the first carrier, uplink transmission on the first carrier by using the radio frequency capability used on the first carrier in the case of single transmission on the first carrier.

For example, the terminal performs, when the terminal determines that simultaneous transmission is performed on the first carrier and the one or more carriers, uplink transmission on the first carrier by using the radio frequency capability used on the first carrier in the case of simultaneous transmission on the first carrier and the one or more carriers. Further, if there are a plurality of radio frequency capabilities used on the first carrier in the case of simultaneous transmission on the first carrier and different carriers, after determining that simultaneous transmission is performed on the first carrier and the one or more carriers, the terminal determines that a radio frequency capability to be used on the first carrier depending on which carriers the one or more carriers are.

Specifically, a radio frequency channel capability in one radio frequency capability on one carrier configured in the configuration information has a correspondence with another radio frequency capability. The terminal knows a radio frequency channel capability used on a carrier in the case of single transmission on the carrier and radio frequency channel capabilities used on the carrier in the case of simultaneous transmission on the carrier and different carriers. Therefore, the terminal may first determine a radio frequency channel capability used on a carrier in the case of single transmission or simultaneous transmission, and then determine another radio frequency capability based on the radio frequency channel capability, to determine a radio frequency capability used on the carrier.

For example, based on the example 1, the carrier A and the carrier B each have two radio frequency capabilities, which are denoted as a radio frequency capability 1 and a radio frequency capability 2. For radio frequency channel capabilities and other radio frequency capabilities on the carrier A and the carrier B, refer to Table 5. A radio frequency channel capability 2T of the carrier A corresponds to another radio frequency capability 1, a radio frequency channel capability 2T of the carrier B corresponds to another radio frequency capability 2, a radio frequency channel capability 1T of the carrier A corresponds to another radio frequency capability 3, and a radio frequency channel capability 1T of the carrier B corresponds to another radio frequency capability 4.

TABLE 5

| | Radio frequency capability 1 | | Radio frequency capability 2 | |
| --- | --- | --- | --- | --- |
| Carrier | Radio frequency channel capability | Another radio frequency capability | Radio frequency channel capability | Another radio frequency capability |
| A | 2T | Another radio frequency capability 1 | 1T | Another radio frequency capability 3 |
| B | 2T | Another radio frequency capability 2 | 1T | Another radio frequency capability 4 |

According to Table 5, if the terminal determines that single transmission is performed on the carrier A, and may further determine that the radio frequency channel capability on the carrier A is 2T, the terminal may determine that another radio frequency capability corresponding to the carrier A is the another radio frequency capability 1. The terminal may perform single transmission on the carrier A by using the determined radio frequency channel capability on the carrier A and the determined another radio frequency capability. If the terminal determines that single transmission is performed on the carrier A and the carrier B, and may further determine that the radio frequency channel capability on the carrier A is 1T, the terminal may determine that another radio frequency capability corresponding to the carrier A is the another radio frequency capability 3, and that another radio frequency capability corresponding to the carrier B is the another radio frequency capability 4. The terminal may perform simultaneous transmission on the carrier A and the carrier B by using the determined radio frequency channel capability and another radio frequency capability on the carrier A and the determined radio frequency channel capability and another radio frequency capability on the carrier B.

According to the method provided in Embodiment 2, the network device may configure one or more radio frequency capabilities on each of one or more carriers for the terminal. The terminal may select, based on statuses of uplink scheduling performed by the network device on one carrier and one or more carriers other than the carrier, one of a plurality of radio frequency capabilities on the carrier for uplink transmission, and the network device does not need to indicate, to the terminal, a radio frequency capability used by the terminal on the carrier. On different time domain resources, the terminal may flexibly determine, based on radio frequency capabilities of the terminal, a radio frequency capability used on a carrier, thereby improving an uplink transmission capability of the terminal.

Embodiment 3

Embodiment 3 provides a radio frequency capability configuration method. Different from that in Embodiment 1 and Embodiment 2, in Embodiment 3, a network device does not configure a plurality of radio frequency capabilities for each carrier, but configures a plurality of sets of radio frequency capabilities for a terminal. One set of radio frequency capabilities includes a radio frequency capability used on a carrier in the case of single-carrier transmission on the carrier, a radio frequency capability used on each of a plurality of carriers in the case of simultaneous transmission on the plurality of carriers, or a radio frequency capability used on each of a plurality of carriers in the case of TDM transmission on the plurality of carriers. Subsequently, the network device indicates a set of radio frequency capabilities to the terminal. The terminal performs uplink transmission on one or more carriers in the set of radio frequency capabilities based on radio frequency capabilities on the one or more carriers in the set of radio frequency capabilities.

Figures 14, 15:
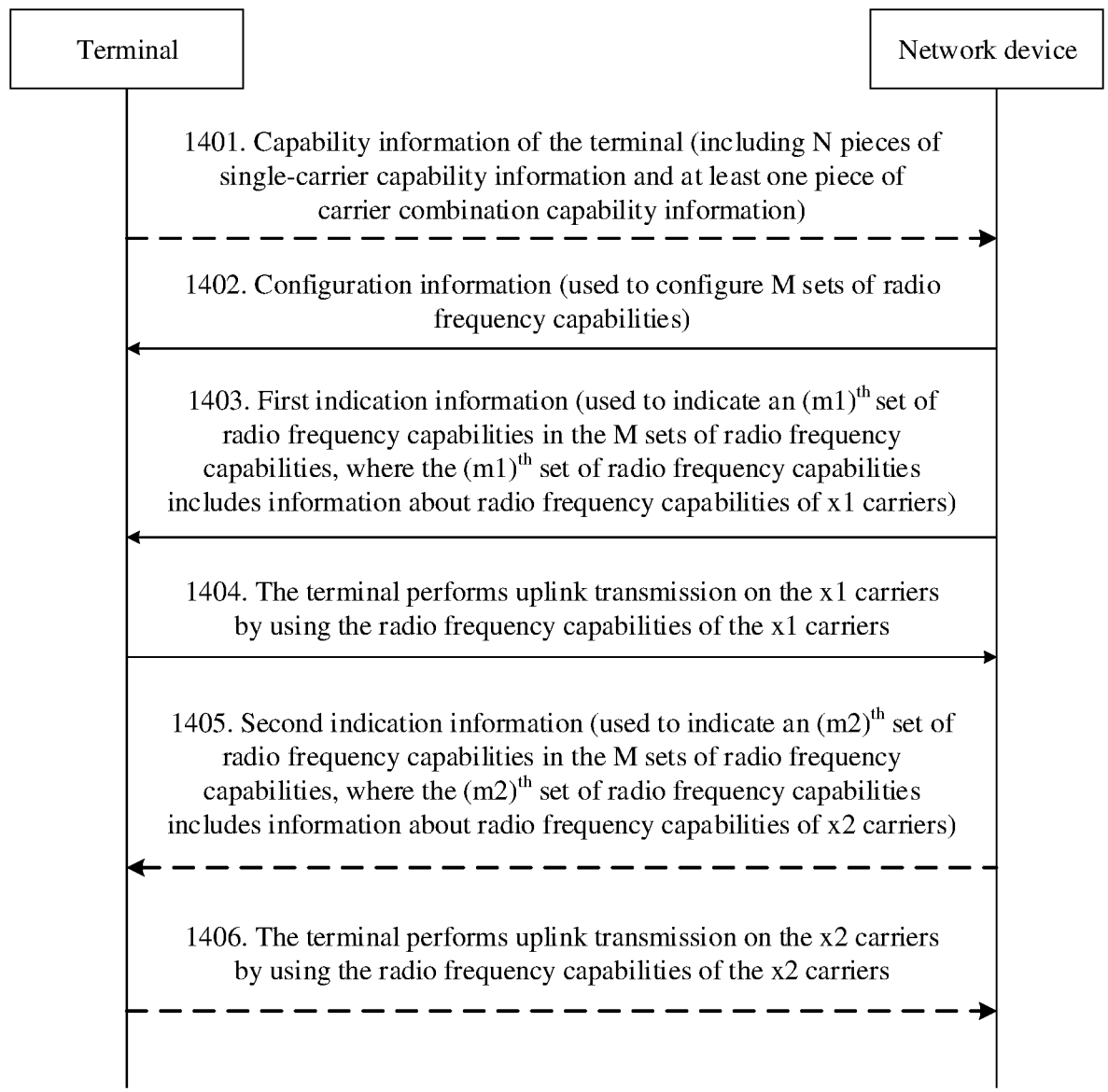
FIG. 15 is a schematic diagram of a slot configuration according to an embodiment of this application.

As shown in FIG. 14, the radio frequency capability configuration method provided in Embodiment 3 includes the following steps.

1401. The terminal sends capability information of the terminal to the network device, where the capability information of the terminal includes N pieces of single-carrier capability information and at least one piece of carrier combination capability information, one piece of single-carrier capability information in the N pieces of single-carrier capability information is information about a radio frequency capability used on one of N carriers in the case of single-carrier transmission, and the carrier combination capability information is information about a radio frequency capability used on each of at least two of the N carriers in the case of simultaneous transmission or TDM transmission on the at least two carriers. Correspondingly, the network device receives the capability information of the terminal from the terminal.

Based on the foregoing example 1, for information included in the capability information of the terminal, refer to Table 6 or Table 7.

TABLE 6

| Carrier | Radio frequency capability in single-carrier transmission | Radio frequency capability in simultaneous transmission on the carrier A and the carrier B |
|---|---|---|
| A | 2T | 1T |
| B | 2T | 1T |

TABLE 7

| Carrier | Radio frequency capability in single-carrier transmission | Radio frequency capability in simultaneous transmission on the carrier A and the carrier B | Radio frequency capability in TDM transmission on the carrier A and the carrier B |
|---|---|---|---|
| A | 2T | 1T | 2T |
| B | 2T | 1T | 2T |

Based on the foregoing example 2, for information included in the capability information of the terminal, refer to Table 8 or Table 9.

TABLE 8

| Transmission mode | Radio frequency capability on A | Radio frequency capability on B | Radio frequency capability on C |
|---|---|---|---|
| Single-carrier transmission on A | 3T | — | — |
| Single-carrier transmission on B | — | 2T | — |
| Single-carrier transmission on C | — | — | 2T |
| Simultaneous transmission on A and B | 2T | 1T | — |
| Simultaneous transmission on A and C | 2T | — | 1T |
| Simultaneous transmission on B and C | — | 1T | 1T |
| Simultaneous transmission on A, B, and C | 1T | 1T | 1T |

TABLE 9

| Transmission mode | | Radio frequency capability on A | Radio frequency capability on B | Radio frequency capability on C |
|---|---|---|---|---|
| Single-carrier transmission on A | | 3T | — | — |
| Single-carrier transmission on B | | — | 2T | — |
| Single-carrier transmission on C | | — | — | 2T |
| A + B | TDM | 3T | 2T | — |
| | Simultaneous transmission | 2T | 1T | — |
| A + C | TDM | 3T | — | 2T |
| | Simultaneous transmission | 2T | — | 1T |
| B + C | TDM | — | 2T | 2T |
| | Simultaneous transmission | — | 1T | 1T |
| A + B + C | TDM | 3T | 2T | 2T |
| | Simultaneous transmission | 1T | 1T | 1T |

When the method provided in Embodiment 3 is applied to a DC scenario, the network device may be a primary network device, or may be a secondary network device. The N carriers may include a carrier between the terminal and the primary network device, and may further include a carrier between the terminal and the secondary network device.

Step 1401 is an optional step. For example, the terminal and the network device may preconfigure a capability of the terminal. In this case, the terminal may not need to report the capability to the network device.

Optionally, the capability information of the terminal further includes information indicating whether the terminal supports dynamic switching between radio frequency capabilities. If the terminal supports dynamic switching between radio frequency capabilities, the terminal may switch between a plurality of radio frequency capabilities on one carrier.

1402. The network device sends configuration information to the terminal, where the configuration information is used to configure M sets of radio frequency capabilities, at least one set of radio frequency capabilities in the M sets of radio frequency capabilities includes information about radio frequency capabilities on a plurality of carriers, and M is an integer greater than 1. Correspondingly, the terminal receives the configuration information from the network device.

Optionally, the M sets of radio frequency capabilities are in a one-to-one correspondence with M indexes.

If any set of radio frequency capabilities in the M sets of radio frequency capabilities includes information about radio frequency capabilities on a plurality of carriers, the radio frequency capabilities on the plurality of carriers may be radio frequency capabilities used when the terminal performs uplink transmission on the plurality of carriers in TDM mode or in simultaneous transmission mode.

If step 1401 is performed, during specific implementation, step 1402 includes the network device sends the configuration information to the terminal based on the capability information of the terminal. Specifically, the network device may determine, based on capability information reported by the terminal and obtained in single-carrier transmission, a radio frequency capability used on each carrier in the case of single-carrier transmission, and determine, based on capability information obtained in simultaneous transmission on a plurality of carriers, a radio frequency capability used on each of the plurality of carriers in the case of the simultaneous transmission or TDM transmission on the plurality of carriers.

If step 1401 is not performed, the configuration information may be preconfigured in the network device, or directly obtained by the network device from another device.

Based on the foregoing example 1, assuming that a radio frequency capability on each carrier in a set of radio frequency capabilities includes only a radio frequency channel capability, the configuration information may be configured with four sets of radio frequency capabilities. For details, refer to Table 10.

TABLE 10

| Identifier | Carrier or carrier combination | Transmission mode | Radio frequency capability on A | Radio frequency capability on B |
|---|---|---|---|---|
| 1 | A | Single-carrier transmission | 2T | — |
| 2 | B | Single-carrier transmission | — | 2T |
| 3 | A + B | TDM | 2T | 2T |
| 4 | | Simultaneous transmission | 1T | 1T |

Based on the foregoing example 2, assuming that a radio frequency capability on each carrier in a set of radio frequency capabilities includes only a radio frequency channel capability, the configuration information may be configured with 11 sets of radio frequency capabilities. For details, refer to Table 11.

TABLE 11

| Identifier | Carrier or carrier combination | Transmission mode | Radio frequency capability on A | Radio frequency capability on B | Radio frequency capability on C |
|---|---|---|---|---|---|
| 1 | A | Single-carrier transmission | 3T | — | — |
| 2 | B | Single-carrier transmission | — | 2T | — |
| 3 | C | Single-carrier transmission | — | — | 2T |
| 4 | A + B | TDM | 3T | 2T | — |
| 5 | | Simultaneous transmission | 2T | 1T | — |
| 6 | A + C | TDM | 3T | — | 2T |
| 7 | | Simultaneous transmission | 2T | — | 1T |
| 8 | B + C | TDM | — | 2T | 2T |
| 9 | | Simultaneous transmission | — | 1T | 1T |
| 10 | A + B + C | TDM | 3T | 2T | 2T |
| 11 | | Simultaneous transmission | 1T | 1T | 1T |

Optionally, the configuration information is carried in RRC signaling.

Optionally, the network device may perform step 1302 and step 1402 when the terminal supports dynamic switching between radio frequency capabilities.

1403. The network device sends first indication information to the terminal, where the first indication information is used to indicate an $(m1)^{th}$ set of radio frequency capabilities in the M sets of radio frequency capabilities, the $(m1)^{th}$ set of radio frequency capabilities includes information about radio frequency capabilities on x1 carriers, m1 is an integer greater than 0 and less than or equal to M, and x1 is an integer greater than 0. Correspondingly, the terminal receives the first indication information from the network device.

The first indication information may indicate the $(m1)^{th}$ set of radio frequency capabilities to the terminal by indicating an identifier corresponding to the $(m1)^{th}$ set of radio frequency capabilities.

Optionally, the first indication information is carried in MAC CE signaling or DCI.

Optionally, the network device may send the first indication information to the terminal by using one of the x1 carriers.

1404. The terminal performs uplink transmission on the x1 carriers by using the radio frequency capabilities on the x1 carriers.

In one case, the information about the radio frequency capabilities on the x1 carriers includes information about a radio frequency capability on each of the x1 carriers when the terminal performs uplink transmission on the x1 carriers in TDM mode. In this case, during specific implementation, step 1404 includes the terminal performs uplink transmission on the x1 carriers in TDM mode by using the radio frequency capabilities on the x1 carriers.

For example, based on the example shown in Table 11, if the first indication information indicates a set of radio frequency capabilities corresponding to the identifier 4, the terminal determines, based on the first indication information, to perform uplink transmission on the carrier A and the carrier B in TDM mode, and determines to perform uplink transmission on the carrier A by using 3T, and to perform uplink transmission on the carrier B by using 2T.

In another case, the information about the radio frequency capabilities on the x1 carriers includes information about a radio frequency capability on each of the x1 carriers when the terminal performs uplink transmission on the x1 carriers in simultaneous transmission mode. In this case, during specific implementation, step 1404 includes the terminal performs uplink transmission on the x1 carriers in simultaneous transmission mode by using the radio frequency capabilities on the x1 carriers.

For example, based on the example shown in Table 11, if the first indication information indicates a set of radio frequency capabilities corresponding to the identifier 5, the terminal determines, based on the first indication information, to perform uplink transmission on the carrier A and the carrier B in simultaneous transmission mode, and determines to perform uplink transmission on the carrier A by using 2T, and to perform uplink transmission on the carrier B by using 1T.

If one or more carriers in the x1 carriers are carriers between the terminal and the network device in this embodiment of this application, the network device performs uplink receiving on the one or more carriers.

After step 1404, the network device may change, according to a requirement, a radio frequency capability used by the terminal. In this case, optionally, the method further includes the following.

1405. The network device sends second indication information to the terminal, where the second indication information is used to indicate an $(m2)^{th}$ set of radio frequency capabilities in the M sets of radio frequency capabilities, the $(m2)^{th}$ set of radio frequency capabilities includes information about radio frequency capabilities on x2 carriers, m2 is an integer greater than 0 and less than or equal to M, and x2 is an integer greater than 0. Correspondingly, the terminal receives the second indication information from the network device.

Optionally, the first indication information is carried in MAC CE signaling or DCI.

Optionally, the first indication information and the second indication information may be both carried in MAC CE signaling, or may be both carried in DCI, or one may be carried in MAC CE signaling and the other may be carried in DCI.

Optionally, the network device may send the second indication information to the terminal by using one of the x2 carriers.

Step 1405 is an optional step.

1406. The terminal performs uplink transmission on the x2 carriers by using the radio frequency capabilities on the x2 carriers.

In one case, the information about the radio frequency capabilities on the x2 carriers is information about a radio frequency capability on each of the x2 carriers when the terminal performs uplink transmission on the x2 carriers in time division multiplexing mode. In this case, during specific implementation, step 1406 includes the terminal performs uplink transmission on the x2 carriers in time division multiplexing mode by using the radio frequency capabilities on the x2 carriers.

In another case, the information about the radio frequency capabilities on the x2 carriers is information about a radio frequency capability on each of the x2 carriers when the terminal performs uplink transmission on the x2 carriers in simultaneous transmission mode. In this case, during specific implementation, step 1406 includes the terminal performs uplink transmission on the x2 carriers in simultaneous transmission mode by using the radio frequency capabilities on the x2 carriers.

If one or more carriers in the x2 carriers are carriers between the terminal and the network device in this embodiment of this application, the network device performs uplink receiving on the one or more carriers.

According to the method provided in Embodiment 3, the network device may configure, for the terminal, a plurality of sets of radio frequency capabilities, and then indicate one set of radio frequency capabilities by using indication information, so that the terminal can determine, by using the indication information, a set of to-be-used radio frequency capabilities in the plurality of sets of radio frequency capabilities. The network device can flexibly indicate a set of radio frequency capabilities to be used by the terminal. In this way, on different time domain resources, the network device can indicate a set of to-be-used radio frequency capabilities to the terminal based on radio frequency capabilities used by the terminal on a carrier, thereby improving an uplink transmission capability of the terminal.

The solutions in the foregoing embodiments of this application may be combined on a premise that there is no contradiction.

It should be noted that different carriers in the foregoing embodiments may be asynchronous, that is, start symbols of slots corresponding to different carriers are not aligned. For example, refer to FIG. 15. Start symbols of slots corresponding to a carrier 1, a carrier 2, and a carrier 3 are not aligned, and start symbols of slots corresponding to the carrier 3 and a carrier 4 are aligned.

In this case, the terminal may measure a system frame number and frame timing difference (SFTD, where the SFTD refers to an information element "SFN and frame timing difference" in section 5.1.14 in 3GPP TS 38.215 V15.4.0, and SFN refers to a system frame number (system frame number)) and uplink timing advance (timing advance, TA) information, and send the SFTD and the uplink TA information to the network device. The network device may obtain, based on the SFTD and/or the uplink TA information reported by the terminal, a delay difference between slots corresponding to different carriers. In this case, if uplink time domain resources of a plurality of carriers overlap, when the terminal performs uplink transmission on only one carrier, the network device needs to perform symbol-level scheduling avoidance on the other carriers, to prevent the terminal from performing simultaneous transmission on the overlapping uplink time domain resources of the plurality of carriers.

The foregoing mainly describes the solutions in the embodiments of this application from a perspective of interaction between network elements. It may be understood that to implement the foregoing functions, the network elements, for example, the network device and the terminal, include at least one of corresponding hardware structures and software modules for implementing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example, and is merely a logical function division. During actual implementation, another division manner may be used.

Figure 16:
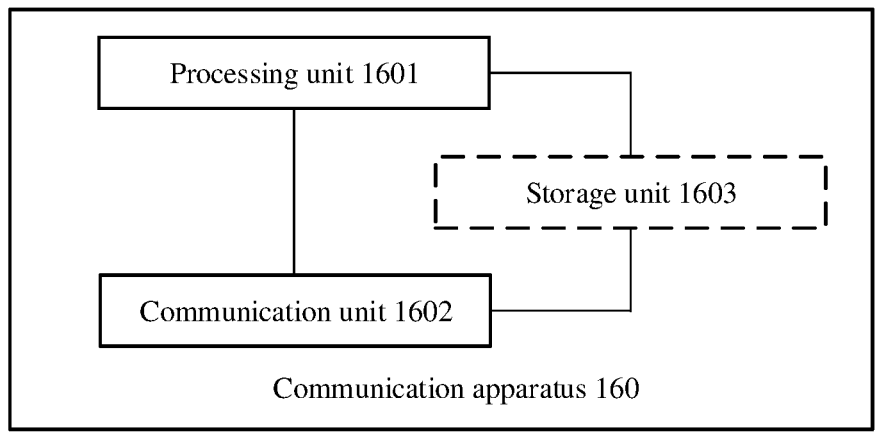
FIG. 16 is a schematic diagram of composition of a communication apparatus according to an embodiment of this application.

When an integrated unit is used, FIG. 16 is a schematic diagram of a possible structure of the communication apparatus (denoted as a communication apparatus 160) in the foregoing embodiments. The communication apparatus 160 includes a processing unit 1601 and a communication unit 1602, and may further include a storage unit 1603. The schematic diagram of the structure shown in FIG. 16 may be used to illustrate structures of the network device and the terminal in the foregoing embodiments.

When the schematic diagram of the structure shown in FIG. 16 is used to illustrate the structure of the terminal in the foregoing embodiments, the processing unit 1601 is configured to control and manage an action of the terminal. For example, the processing unit 1601 is configured to perform, via the communication unit 1602, step 901 to step 906 in FIG. 9, step 1301, step 1303, and step 1304 in FIG. 13, step 1401 to step 1406 in FIG. 14, and/or actions performed by the terminal in another process described in the embodiments of this application. The processing unit 1601 may communicate with another network entity via the communication unit 1602, for example, communicate with the network device shown in FIG. 9. The storage unit 1603 is configured to store program code and data of the terminal.

When the schematic diagram of the structure shown in FIG. 16 is used to illustrate the structure of the terminal in the foregoing embodiments, the communication apparatus 160 may be a terminal, or may be a chip in the terminal.

When the schematic diagram of the structure shown in FIG. 16 is used to illustrate the structure of the network device in the foregoing embodiments, the processing unit 1601 is configured to control and manage an action of the network device. For example, the processing unit 1601 is configured to perform, via the communication unit 1602, step 901 to step 906 in FIG. 9, step 1301 to step 1304 in FIG. 13, step 1401 to step 1406 in FIG. 14, and/or actions performed by the network device in another process described in the embodiments of this application. The processing unit 1601 may communicate with another network entity via the communication unit 1602, for example, communicate with the terminal shown in FIG. 9. The storage unit 1603 is configured to store program code and data of the network device.

When the schematic diagram of the structure shown in FIG. 16 is used to illustrate the structure of the network device in the foregoing embodiment, the communication apparatus 160 may be a network device, or may be a chip in the network device.

When the communication apparatus 160 is the terminal or the network device, the processing unit 1601 may be a processor or a controller, and the communication unit 1602 may be a communication interface, a transceiver, a transceiver machine, a transceiver circuit, a transceiver apparatus, or the like. The communication interface is a collective term, and may include one or more interfaces. The storage unit 1603 may be a memory. When the communication apparatus 160 is the chip in the terminal or the network device, the processing unit 1601 may be a processor or a controller, and the communication unit 1602 may be an input/output interface, a pin, a circuit, or the like. The storage unit 1603 may be a storage unit (for example, a register or a cache) in the chip, or may be a storage unit (for example, a read-only memory (ROM) or a random access memory (RAM)) outside the chip and in the terminal or the network device.

The communication unit may also be referred to as a transceiver unit. An antenna and a control circuit that have receiving and sending functions in the communication apparatus 160 may be considered as the communication unit 1602 in the communication apparatus 160, and a processor that has a processing function in the communication apparatus 160 may be considered as the processing unit 1601 in the communication apparatus 160. Optionally, a component configured to implement a receiving function in the communication unit 1602 may be considered as a receiving unit. The receiving unit is configured to perform the receiving step in the embodiments of this application. The receiving unit may be a receiver, a receiver circuit, or the like. A component configured to implement a sending function in the communication unit 1602 may be considered as a sending unit. The sending unit is configured to perform the sending step in the embodiments of this application. The sending unit may be a transmitter, a transmitter circuit, or the like.

When the integrated unit in FIG. 16 is implemented in a form of a software functional module and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The storage medium storing the computer software product includes any medium that can store program code, such as a USB flash drive, a removable hard disk, a read-only memory, a random access memory, a magnetic disk, or an optical disc.

The unit in FIG. 16 may also be referred to as a module. For example, the processing unit may be referred to as a processing module.

Figure 17:
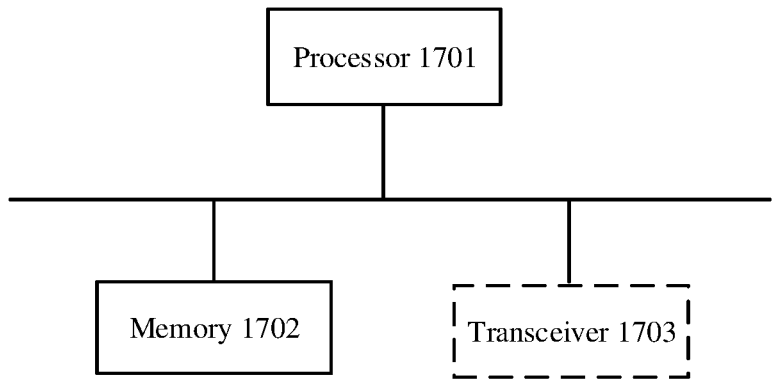
FIG. 17 and FIG. 18 are each a schematic diagram of a hardware structure of a communication apparatus according to an embodiment of this application.
Figure 18:
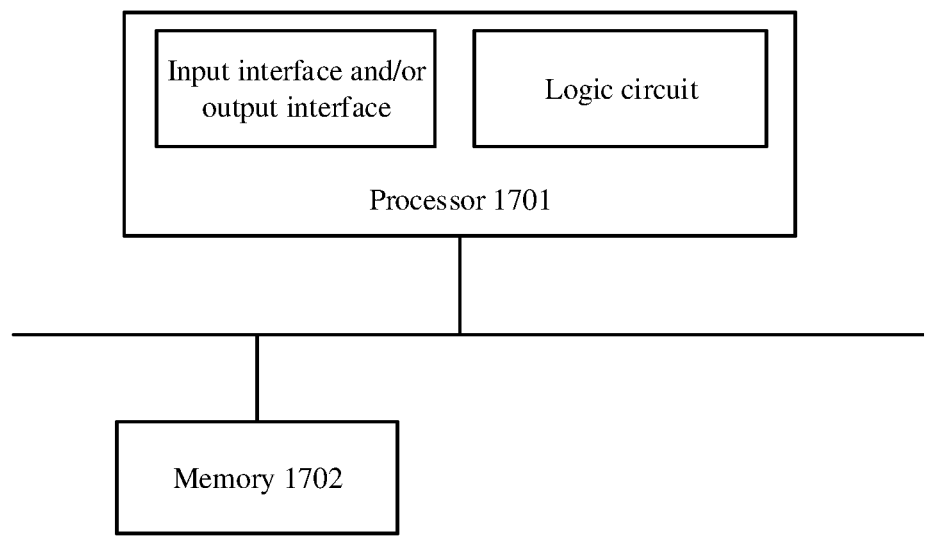

An embodiment of this application further provides a schematic diagram of a hardware structure of a communication apparatus. Refer to FIG. 17 or FIG. 18. The communication apparatus includes a processor 1701, and optionally, further includes a memory 1702 connected to the processor 1701.

In a first possible implementation, refer to FIG. 17. The communication apparatus further includes a transceiver 1703. The processor 1701, the memory 1702, and the transceiver 1703 are connected by using a bus. The transceiver 1703 is configured to communicate with another device or a communication network. Optionally, the transceiver 1703 may include a transmitter and a receiver. A component configured to implement a receiving function in the transceiver 1703 may be considered as a receiver. The receiver is configured to perform a receiving step in the embodiments of this application. A component configured to implement a sending function in the transceiver 1703 may be considered as a transmitter. The transmitter is configured to perform a sending step in the embodiments of this application.

Based on the first possible implementation, the schematic diagram of the structure shown in FIG. 17 may be used to illustrate a structure of the network device or the terminal in the foregoing embodiments.

When the schematic diagram of the structure shown in FIG. 17 is used to illustrate the structure of the terminal in the foregoing embodiments, the processor 1701 is configured to control and manage an action of the terminal. For example, the processor 1701 is configured to support the terminal in performing step 901 to step 906 in FIG. 9, step 1301, step 1303, and step 1304 in FIG. 13, step 1401 to step 1406 in FIG. 14, and/or actions performed by the terminal in another process described in the embodiments of this application. The processor 1701 may communicate with another network entity by using the transceiver 1703, for example, communicate with the network device shown in FIG. 9. The memory 1702 is configured to store program code and data of the terminal.

When the schematic diagram of the structure shown in FIG. 17 is used to illustrate the structure of the network device in the foregoing embodiments, the processor 1701 is configured to control and manage an action of the network device. For example, the processor 1701 is configured to support the network device in performing step 901 to step 906 in FIG. 9, step 1301 to step 1304 in FIG. 13, step 1401 to step 1406 in FIG. 14, and/or actions performed by the network device in another process described in the embodiments of this application. The processor 1701 may communicate with another network entity by using the transceiver 1703, for example, communicate with the terminal shown in FIG. 9. The memory 1702 is configured to store program code and data of the network device.

In a second possible implementation, the processor 1701 includes a logic circuit and at least one of an input interface and an output interface. The output interface is configured to perform a sending action in a corresponding method, and the input interface is configured to perform a receiving action in a corresponding method.

Based on the second possible implementation, the schematic diagram of the structure shown in FIG. 18 may be used to illustrate a structure of the network device or the terminal in the foregoing embodiments.

When the schematic diagram of the structure shown in FIG. 18 is used to illustrate the structure of the terminal in the foregoing embodiments, the processor 1701 is configured to control and manage an action of the terminal. For example, the processor 1701 is configured to support the terminal in performing step 901 to step 906 in FIG. 9, step 1301, step 1303, and step 1304 in FIG. 13, step 1401 to step 1406 in FIG. 14, and/or actions performed by the terminal in another process described in the embodiments of this application. The processor 1701 may communicate with another network entity through at least one of the input interface and the output interface, for example, communicate with the network device shown in FIG. 9. The memory 1702 is configured to store program code and data of the terminal.

When the schematic diagram of the structure shown in FIG. 18 is used to illustrate the structure of the network device in the foregoing embodiments, the processor 1701 is configured to control and manage an action of the network device. For example, the processor 1701 is configured to support the network device in performing step 901 to step 906 in FIG. 9, step 1301 to step 1304 in FIG. 13, step 1401 to step 1406 in FIG. 14, and/or actions performed by the network device in another process described in the embodiments of this application. The processor 1701 may communicate with another network entity through at least one of the input interface and the output interface, for example, communicate with the terminal shown in FIG. 9. The memory 1702 is configured to store program code and data of the network device.

FIG. 17 and FIG. 18 each may alternatively show a system chip in the network device. In this case, an action performed by the network device may be implemented by the system chip. For a specific action performed, refer to the foregoing descriptions. Details are not described herein again. FIG. 17 and FIG. 18 each may alternatively show a system chip in the terminal. In this case, an action performed by the terminal may be implemented by the system chip. For a specific action performed, refer to the foregoing descriptions. Details are not described herein again.

In addition, the embodiments of this application further provide schematic diagrams of hardware structures of a terminal (denoted as a terminal 190) and a network device (denoted as a network device 200). For details, refer to FIG. 19 and FIG. 20.

Figure 19:
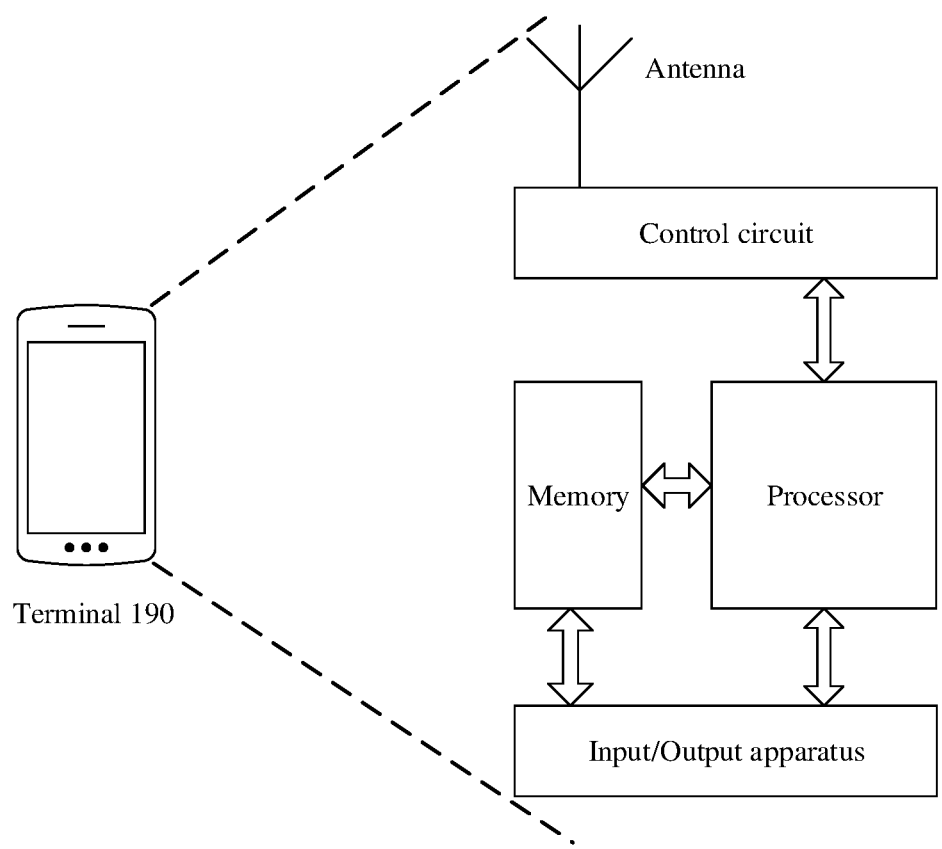
FIG. 19 is a schematic diagram of a hardware structure of a terminal according to an embodiment of is this application.

FIG. 19 is the schematic diagram of the hardware structure of the terminal 190. For ease of description, FIG. 19 shows only main components of the terminal. As shown in FIG. 19, the terminal 190 includes a processor, a memory, a control circuit, an antenna, and an input/output apparatus.

The processor is mainly configured to process a communication protocol and communication data, control the entire terminal, execute a software program, and process data of the software program. For example, the processor is configured to control the terminal to perform step 901 to step 906 in FIG. 9, step 1301, step 1303, and step 1304 in FIG. 13, step 1401 to step 1406 in FIG. 14, and/or actions performed by the terminal in another process described in the embodiments of this application. The memory is mainly configured to store the software program and the data. The control circuit (which may also be referred to as a radio frequency circuit) is mainly configured to perform conversion between a baseband signal and a radio frequency signal, and process the radio frequency signal. A combination of the control circuit and the antenna may be referred to as a transceiver, mainly configured to send and receive a radio frequency signal in a form of an electromagnetic wave. The input/output apparatus such as a touchscreen, a display, or a keyboard is mainly configured to receive data entered by a user and output data to the user.

After the terminal is powered on, the processor can read the software program in the memory, interpret and execute instructions of the software program, and process the data of the software program. When data needs to be sent by using the antenna, after performing baseband processing on the to-be-sent data, the processor outputs a baseband signal to the control circuit in the control circuit. After performing radio frequency processing on the baseband signal, the control circuit sends a radio frequency signal to the outside through the antenna in a form of an electromagnetic wave. When data is sent to the terminal, the control circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 19 shows only one memory and one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. Functions of the baseband processor and the central processing unit are integrated into the processor in FIG. 19. A person skilled in the art may understand that the baseband processor and the central processing unit each may be an independent processor, and are interconnected by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 20:
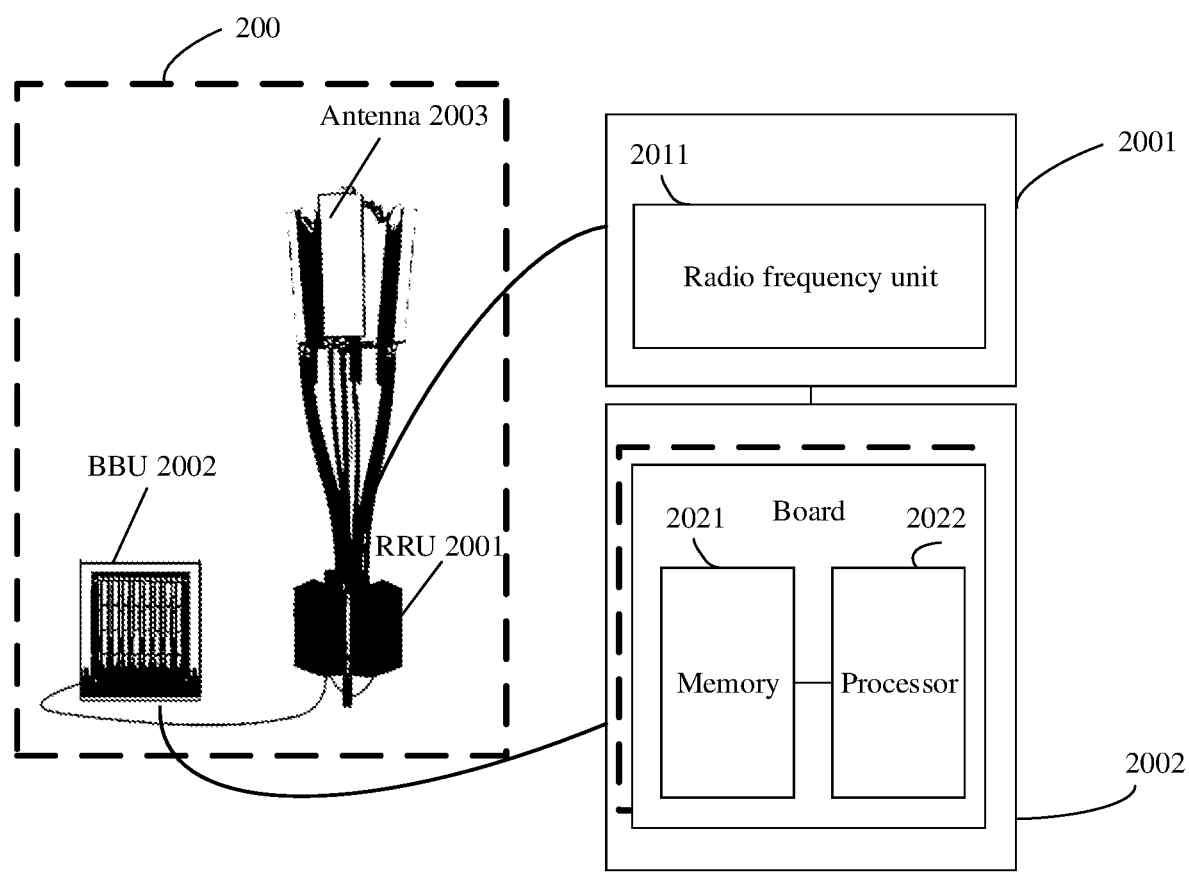
FIG. 20 is a schematic diagram of a hardware structure of a network device according to an embodiment of this application.

FIG. 20 is the schematic diagram of the hardware structure of the network device 200. The network device 200 may include one or more radio frequency units, such as a remote radio unit (RRU) 2001, one or more baseband units (BBUs) (also referred to as digital units (DUs)) 2002, and one or more antennas 2003.

The RRU 2001 may be referred to as a transceiver unit, a transceiver machine, a transceiver circuit, a transceiver, or the like, and may include a radio frequency unit 2011. The RRU 2001 is mainly configured to send and receive a radio frequency signal and perform conversion between a radio frequency signal and a baseband signal. The RRU 2001 and the BBU 2002 may be physically disposed together, or may be physically disposed separately, for example, in a distributed base station.

The BBU 2002 is a control center of the network device, may be referred to as a processing unit, and is mainly configured to complete baseband processing functions such as channel coding, multiplexing, modulation, and spectrum spreading.

In an embodiment, the BBU 2002 may include one or more boards. A plurality of boards may jointly support a radio access network (such as an LTE network) of a single RAT, or may separately support radio access networks (such as an LTE network, a 5G network, or another network) of different RATs. The BBU 2002 further includes a memory 2021 and a processor 2022. The memory 2021 is configured to store necessary instructions and necessary data. The processor 2022 is configured to control the network device to perform a necessary action. The memory 2021 and the processor 2022 may serve one or more boards. In other words, a memory and a processor may be independently disposed on each board. Alternatively, a plurality of boards may share a same memory and a same processor. In addition, a necessary circuit may be further disposed on each board.

It should be understood that the network device 200 shown in FIG. 20 can perform step 901 to step 906 in FIG. 9, step 1301 to step 1304 in FIG. 13, step 1401 to step 1406 in FIG. 14, and/or actions performed by the network device in another process described in the embodiments of this application. Operations, functions, or operations and functions of modules in the network device 200 are separately set to implement corresponding procedures performed in the foregoing method embodiment. For details, refer to the descriptions in the foregoing method embodiments. To avoid repetition, detailed descriptions are properly omitted herein.

In an implementation process, the steps of the methods in the embodiments may be performed by using a hardware integrated logic circuit in the processor, or by using instructions in a form of software. The steps of the methods disclosed with reference to the embodiments of this application may be directly performed by a hardware processor, or may be performed by using a combination of hardware and software modules in the processor.

The processor in this application may include but is not limited to at least one of the following computing devices that run software, including a central processing unit (CPU), a microprocessor, a digital signal processor (DSP), a microcontroller unit (MCU), an artificial intelligence processor, or the like. Each computing device may include one or more cores configured to perform an operation or processing by executing a software instruction. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an application specific integrated circuit (ASIC) as a built-in processor of the ASIC, and the ASIC integrated with the processor may be independently packaged or may be packaged with another circuit. In addition to the core configured to perform an operation or processing by executing a software instruction, the processor may further include a necessary hardware accelerator, for example, a field programmable gate array (FPGA), a PLD (programmable logic device), or a logic circuit that implements a dedicated logic operation.

The memory in the embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

An embodiment of this application further provides a chip. The chip includes a processor and an interface circuit. The interface circuit is coupled to the processor. The processor is configured to run a computer program or instructions, to implement the foregoing method. The interface circuit is configured to communicate with another module outside the chip.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
    sending, by a network device, to a terminal, configuration information indicating M sets of radio frequency capabilities, wherein each set of radio frequency capabilities of the M sets of radio frequency capabilities includes one or more radio frequency capabilities on one or more carriers, wherein a radio frequency capability on each carrier of the one or more carriers comprises a quantity of multiple-input multiple-output (MIMO) layers, and wherein M is an integer greater than 1,
    wherein the one or more radio frequency capabilities on the one or more carriers comprise at least one of a radio frequency capability on a carrier of the one or more carriers in a case of single-carrier uplink transmission performed on the carrier, a radio frequency capability used on each carrier of a plurality of carriers of the one or more carriers in a case of simultaneous uplink transmission performed on the plurality of carriers, or a radio frequency capability used on each carrier of a plurality of carriers of the one or more carriers in a case of time division multiplexing (TDM) uplink transmission performed on the plurality of carriers; and
    after the sending the configuration information, sending, by the network device, to the terminal, first indication information to the terminal, wherein the first indication information indicates a set of radio frequency capabilities in the M sets of radio frequency capabilities.

2. The method according to claim 1, wherein the configuration information is carried in radio resource control (RRC) signaling, and wherein the first indication information is carried in media access control control element (MAC CE) signaling or downlink control information (DCI).

3. The method according to claim 1, wherein the first indication information indicates an $(m1)^{th}$ set of radio frequency capabilities in the M sets of radio frequency capabilities, and wherein the $(m1)^{th}$ set of radio frequency capabilities includes radio frequency capabilities on x1 carriers; and
    wherein the $(m1)^{th}$ set of radio frequency capabilities includes a radio frequency capability on each of the x1 carriers in case of at least one of TDM uplink transmission or simultaneous uplink transmission performed on the x1 carriers, wherein m1 is an integer greater than 0, and less than or equal to M, and wherein x1 is an integer greater than 0.

4. The method according to claim 3, wherein the M sets of radio frequency capabilities correspond to M identifiers, and wherein the first indication information includes an identifier corresponding to the $(m1)^{th}$ set of radio frequency capabilities.

5. The method according to claim 1, further comprising:
    receiving, by the network device, from the terminal, capability information, wherein the capability information includes a least one piece of single-carrier capability information and at least one piece of carrier combination capability information, wherein the single-carrier capability information indicates a radio frequency capability on a carrier of single-carrier transmission, and wherein the carrier combination capability information indicates a radio frequency capability on each carrier of at least two carriers of at least one of simultaneous transmission or TDM transmission on the at least two carriers; and
    determining, by the network device, the configuration information based on the capability information.

6. A method, comprising:
    receiving, by a terminal, from a network device, configuration information indicating M sets of radio frequency capabilities, wherein each set of radio frequency capabilities of the M sets of radio frequency capabilities includes one or more radio frequency capabilities on one or more carriers, wherein a radio frequency capability on each carrier of the one or more carriers comprises a quantity of multiple-input multiple-output (MIMO) layers, and wherein M is an integer greater than 1,
    wherein the one or more radio frequency capabilities on the one or more carriers comprise at least one of a radio frequency capability on a carrier of the one or more carriers in a case of single-carrier uplink transmission performed on the carrier, a radio frequency capability used on each carrier of a plurality of carriers of the one or more carriers in a case of simultaneous uplink transmission performed on the plurality of carriers, or a radio frequency capability used on each carrier of a plurality of carriers of the one or more carriers in a case of time division multiplexing (TDM) uplink transmission performed on the plurality of carriers; and
    after the receiving the configuration information, receiving, by the terminal, from the network device, first indication information, wherein the first indication information indicates one set of radio frequency capabilities in the M sets of radio frequency capabilities.

7. The method according to claim 6, wherein the configuration information is carried in a radio resource control (RRC) signaling, and wherein the first indication information is carried in at least one of media access control control element, (MAC CE) signaling or downlink control information (DCI).

8. The method according to claim 6, wherein the first indication information indicates an $(m1)^{th}$ set of radio frequency capabilities of the M sets of radio frequency capabilities, and wherein the $(m1)^{th}$ set of radio frequency capabilities includes radio frequency capabilities on x1 carriers;
- wherein the $(m1)^{th}$ set of radio frequency capabilities includes a radio frequency capability on each carrier of the x1 carriers of TDM uplink transmission or simultaneous uplink transmission performed on the x1 carriers, wherein m1 is an integer greater than 0, and is less than or equal to M, and wherein x1 is an integer greater than 0; and
- wherein the method further comprises:
  - performing at least one of the TDM uplink transmission or the simultaneous uplink transmission on the x1 carriers, according to the radio frequency capability on each of the x1 carriers.

9. The method according to claim 8, wherein the M sets of radio frequency capabilities correspond to M identifiers, and wherein the first indication information includes an identifier corresponding to the $(m1)^{th}$ set of radio frequency capabilities.

10. The method according to claim 6, further comprising:
- sending, by the terminal, to the network device, capability information, wherein the capability information includes a least one piece of single-carrier capability information and at least one piece of carrier combination capability information, wherein the single-carrier capability information indicates a radio frequency capability on a carrier of single-carrier uplink transmission, and wherein the carrier combination capability information indicates a radio frequency capability on each carrier of at least two carriers of at least one of simultaneous uplink transmission or TDM uplink transmission on the at least two carriers.

11. The method according to claim 10, wherein the capability information further comprises information indicating whether the terminal supports dynamic switching between radio frequency capabilities.

12. An apparatus for a terminal, comprising:
- at least one processor; and
- a non-transitory storage medium coupled to the at least one processor and storing executable instructions for execution by the at least one processor, the executable instructions including instructions to cause the apparatus to perform operations including:
- receiving from a network device, configuration information indicating M sets of radio frequency capabilities, wherein each set of radio frequency capabilities of the M sets of radio frequency capabilities includes one or more radio frequency capabilities on one or more carriers, wherein a radio frequency capability on each carrier of the one or more carriers comprises a quantity of multiple-input multiple-output (MIMO) layers, and wherein M is an integer greater than 1,
- wherein the one or more radio frequency capabilities on the one or more carriers comprise at least one of a radio frequency capability on a carrier of the one or more carriers in a case of single-carrier uplink transmission performed on the carrier, a radio frequency capability used on each carrier of a plurality of carriers of the one or more carriers in a case of simultaneous uplink transmission performed on the plurality of carriers, or a radio frequency capability used on each carrier of a plurality of carriers of the one or more carriers in a case of time division multiplexing (TDM) uplink transmission performed on the plurality of carriers; and
- after the receiving the configuration information, receiving from the network device, first indication information, wherein the first indication information indicates one set of radio frequency capabilities in the M sets of radio frequency capabilities.

13. The apparatus according to claim 12, wherein the configuration information is carried in a radio resource control (RRC) signaling, and wherein the first indication information is carried in at least one of a media access control control element (MAC CE) signaling or downlink control information (DCI).

14. The apparatus according to claim 12, wherein the first indication information indicates an $(m1)^{th}$ set of radio frequency capabilities in the M sets of radio frequency capabilities, wherein the $(m1)^{th}$ set of radio frequency capabilities includes radio frequency capabilities on x1 carriers; and
- wherein the $(m1)^{th}$ set of radio frequency capabilities includes a radio frequency capability on each carrier of the x1 carriers in TDM uplink transmission or simultaneous uplink transmission performed on the x1 carriers, wherein m1 is an integer greater than 0, and less than or equal to M, and wherein x1 is an integer greater than 0; and
- wherein the operations further comprise:
  performing TDM uplink transmission or the simultaneous uplink transmission on the x1 carriers according to the radio frequency capability on each of the x1 carriers.

15. The apparatus according to claim 14, wherein the M sets of radio frequency capabilities correspond to M identifiers, and wherein the first indication information includes an identifier corresponding to the $(m1)^{th}$ set of radio frequency capabilities.

16. The apparatus according to claim 12, wherein the operations further comprise:
- sending, to the network device, capability information, wherein the capability information includes a least one piece of single-carrier capability information and at least one piece of carrier combination capability information, wherein the single-carrier capability information indicates a radio frequency capability on a carrier of single-carrier uplink transmission, and wherein the carrier combination capability information indicates a radio frequency capability on each carrier of at least two carriers of simultaneous uplink transmission or TDM uplink transmission on the at least two carriers.

17. The apparatus according to claim 16, wherein the capability information further comprises information indicating whether the terminal supports dynamic switching between radio frequency capabilities.

* * * * *

UNITED STATES PATENT AND TRADEMARK OFFICE
CERTIFICATE OF CORRECTION

| | | |
|---|---|---|
| PATENT NO. | : 12,137,463 B2 | Page 1 of 1 |
| APPLICATION NO. | : 17/541855 | |
| DATED | : November 5, 2024 | |
| INVENTOR(S) | : Xu et al. | |

It is certified that error appears in the above-identified patent and that said Letters Patent is hereby corrected as shown below:

In the Claims

In Column 48, in Claim 5, Line 22, delete "a least" and insert -- at least --.

In Column 48, in Claim 7, Line 66, delete "element," and insert -- element --.

In Column 49, in Claim 10, Line 27, delete "a least" and insert -- at least --.

In Column 50, in Claim 16, Line 45, delete "a least" and insert -- at least --.

Signed and Sealed this
Tenth Day of December, 2024

Katherine Kelly Vidal
*Director of the United States Patent and Trademark Office*